US012619299B2

(12) United States Patent
Spencer et al.

(10) Patent No.: US 12,619,299 B2
(45) Date of Patent: May 5, 2026

(54) SYSTEMS AND METHODS FOR INTERACTIVE VIEWING OF THREE-DIMENSIONAL CONTENT USING ANATOMICAL TRACKING

(71) Applicant: d3Labs Inc., Moultonborough, NH (US)

(72) Inventors: Barry Spencer, Moultonborough, NH (US); Julian George Spencer, Moultonborough, NH (US); Jeremy Egenberger, Pioneertown, CA (US)

(73) Assignee: d3Labs Inc., Moultonborough, NH (US)

( * ) Notice: Subject to any disclaimer, the term of this patent is extended or adjusted under 35 U.S.C. 154(b) by 0 days.

(21) Appl. No.: 18/820,015

(22) Filed: Aug. 29, 2024

(65) Prior Publication Data

US 2025/0076971 A1      Mar. 6, 2025

Related U.S. Application Data

(60) Provisional application No. 63/536,007, filed on Aug. 31, 2023.

(51) Int. Cl.
*G06F 3/01*          (2006.01)
*G06T 15/20*        (2011.01)
(52) U.S. Cl.
CPC .............. *G06F 3/012* (2013.01); *G06F 3/013* (2013.01); *G06T 15/20* (2013.01)
(58) Field of Classification Search
CPC ......... G06F 3/012; G06F 3/013; G06T 15/20; H04N 13/239
See application file for complete search history.

(56) References Cited

U.S. PATENT DOCUMENTS

| | | |
|---|---|---|
| 12,051,149 B2 | 7/2024 | Spencer et al. |
| 2017/0318283 A1 | 11/2017 | Watson et al. |
| 2019/0045167 A1 | 2/2019 | Nestares et al. |
| 2020/0043186 A1 | 2/2020 | Selviah et al. |

(Continued)

OTHER PUBLICATIONS

Kerbl et al., "3D Gaussian Splatting for Real-Time Radiance Field Rendering," [online], [retrieved Oct. 31, 2024], retrieved from the internet: <URL://repo-sam.inria.fr/fungraph/3d-gaussian-splatting/>, 7 pages.

*Primary Examiner* — Abdul-Samad A Adediran
(74) *Attorney, Agent, or Firm* — Carr & Ferrell LLP

(57)          ABSTRACT

Interactive viewing of three-dimensional content includes producing anatomical tracking data representative of the movement of an anatomical feature of a user, rendering of three-dimensional target content and manipulation of the target content in response to the anatomical tracking data such that the user perceives his self or her self to be changing location with respect to a scene or object or perceives being tracked by a virtual character. A system of interactive viewing includes a point cloud capture device by which the at least one anatomical feature of the user can be tracked, a display by which target content is displayed to the user, and a computer operatively connected to the point cloud capture device and display. The computer includes non-transitory computer readable media (CRM) storing instructions by which the virtual scene is manipulated based on input of the anatomical tracking data.

20 Claims, 36 Drawing Sheets

(56)     References Cited

U.S. PATENT DOCUMENTS

| | | | |
|---|---|---|---|
| 2020/0319472 A1 | 10/2020 | Kondo et al. | |
| 2020/0368616 A1 * | 11/2020 | Delamont | ............ H04N 13/239 |
| 2023/0308631 A1 | 9/2023 | Price et al. | |
| 2024/0112396 A1 | 4/2024 | Spencer et al. | |
| 2024/0331274 A1 | 10/2024 | Spencer et al. | |

* cited by examiner

Field of
View

900

Virtual
Object

Controlled
Virtual
Object: 900

Field of
View

—1200

Virtual
Object

Controlled
Virtual
Character: 1200

Eye Translation

Field of View

Character's Eyes Rotate to Maintain Eye Contact

Virtual Object

Controlled Virtual Character

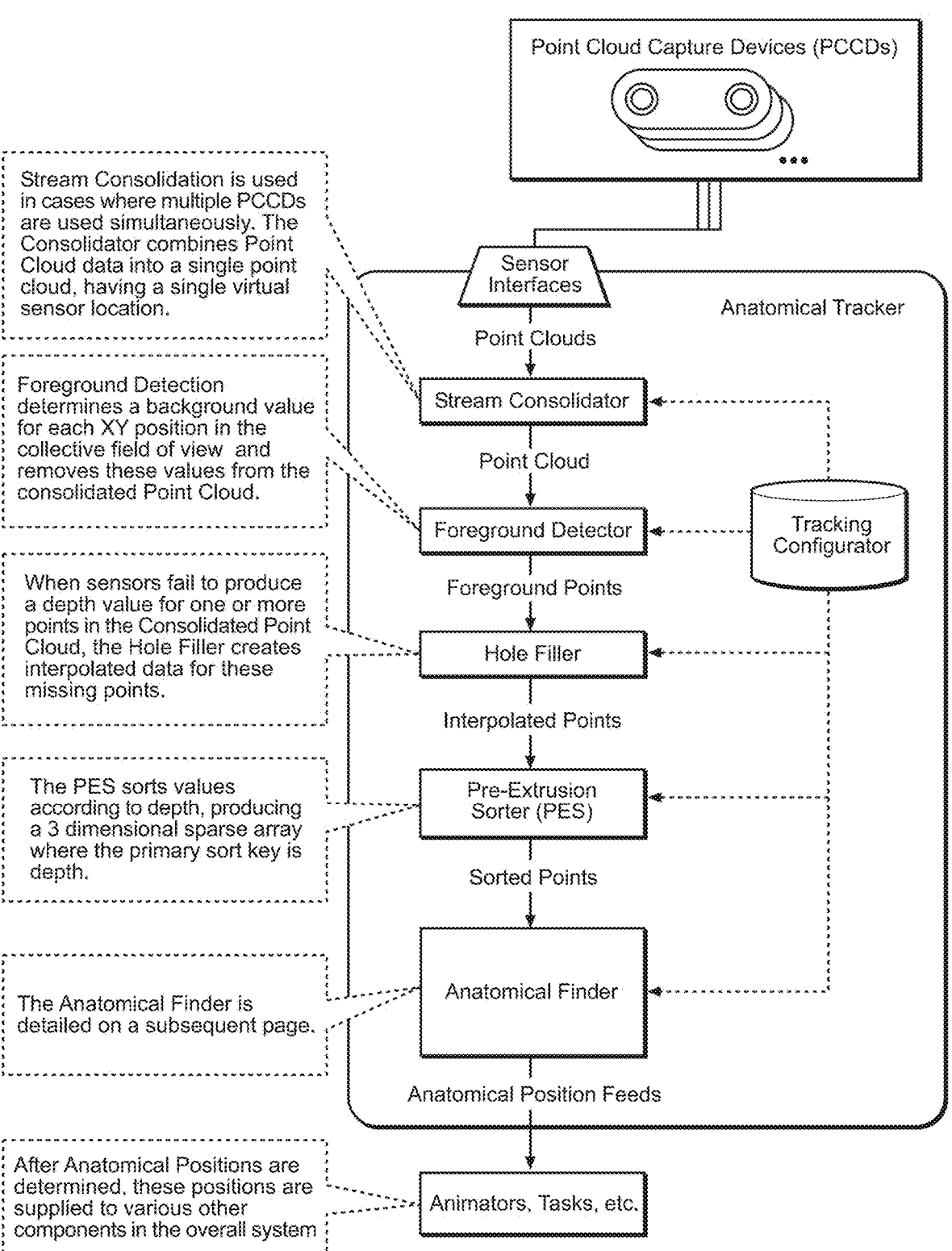

Point Cloud Capture Devices (PCCDs)

Stream Consolidation is used in cases where multiple PCCDs are used simultaneously. The Consolidator combines Point Cloud data into a single point cloud, having a single virtual sensor location.

Foreground Detection determines a background value for each XY position in the collective field of view and removes these values from the consolidated Point Cloud.

When sensors fail to produce a depth value for one or more points in the Consolidated Point Cloud, the Hole Filler creates interpolated data for these missing points.

The PES sorts values according to depth, producing a 3 dimensional sparse array where the primary sort key is depth.

The Anatomical Finder is detailed on a subsequent page.

After Anatomical Positions are determined, these positions are supplied to various other components in the overall system Sensor Interfaces Anatomical Tracker Point Clouds Stream Consolidator Point Cloud Foreground Detector Tracking Configurator Foreground Points Hole Filler Interpolated Points Pre-Extrusion Sorter (PES)

Sorted Points

Anatomical Finder

Anatomical Position Feeds

Animators, Tasks, etc.

FIG. 24

Definitions

• Entryzone - A Cuboid Area
   Close To The Screen.
• Headsphere - A Sphere Of A
   Configurable Radius, Centered
   At A User's Prior Head Position.
• Search - See Blob Finder
   Described In A Subsequent
   Diagram.

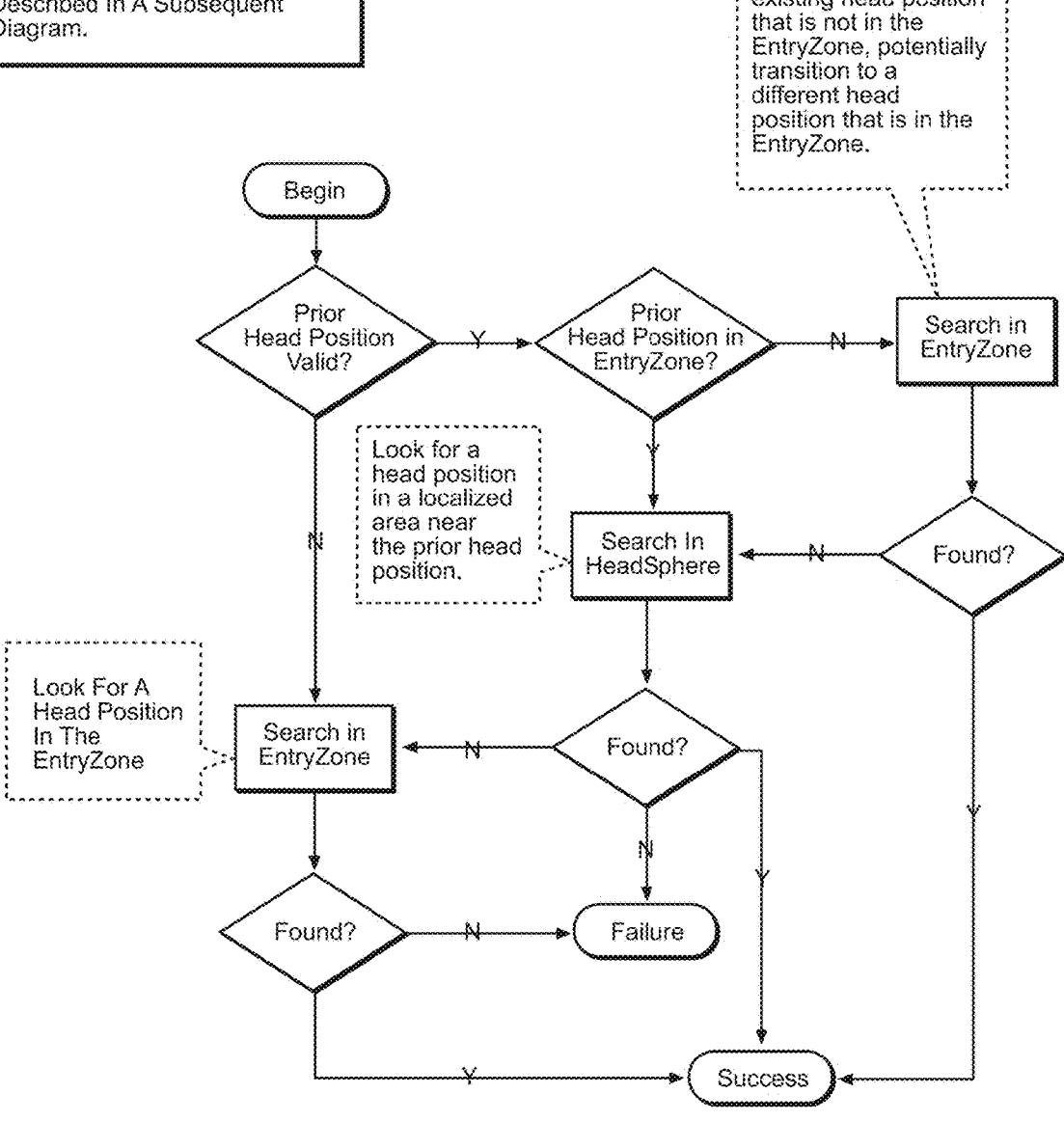

Definitions

• EntryZone - A Cuboid Area Close To The Screen.
• Headsphere - A Sphere Of A Configurable Radius, Centered At A User's Prior Head Position.
• Search - See Blob Finder Described In A Subsequent Diagram.

When there is an existing head position that is not in the EntryZone, potentially transition to a different head position that is in the EntryZone.

Begin

Prior Head Position Valid?

Prior Head Position in EntryZone?

Search in EntryZone

Look for a head position in a localized area near the prior head position.

Search In HeadSphere

Found?

Look For A Head Position In The EntryZone

Search in EntryZone

Found?

Found?

Failure

Success

FIG. 26

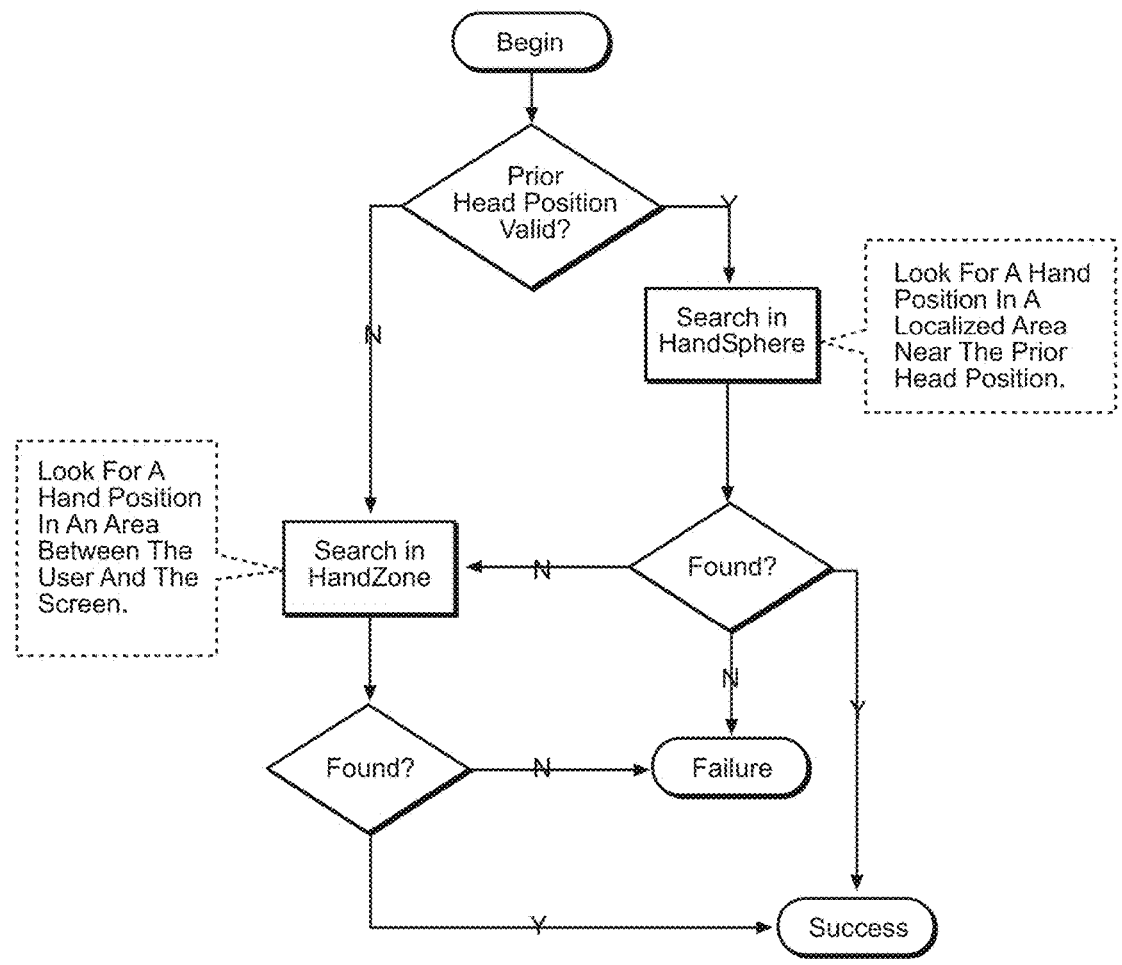

Definitions

• HandZone - A Cuboid Area Between The User's Head Position and The Screen.
• HandSphere - A Sphere Of A Configurable Radius, Centered At A User's Prior Hand Position.
• Search - See Blob Finder Described In A Subsequent Diagram.

Begin

Prior Head Position Valid?

Search in HandSphere

Look For A Hand Position In A Localized Area Near The Prior Head Position.

Look For A Hand Position In An Area Between The User And The Screen.

Search in HandZone

Found?

Found?

Failure

Success

FIG. 27

Definitions

• FingerZone - An Area Between
   The User's Hand Position and The
   Screen.
• FingerSphere - A Sphere Of A
   Configurable Radius, Centered
   At A User's Prior Finger Position.
• Search - See Blob Finder
   Described In A Subsequent
   Diagram.

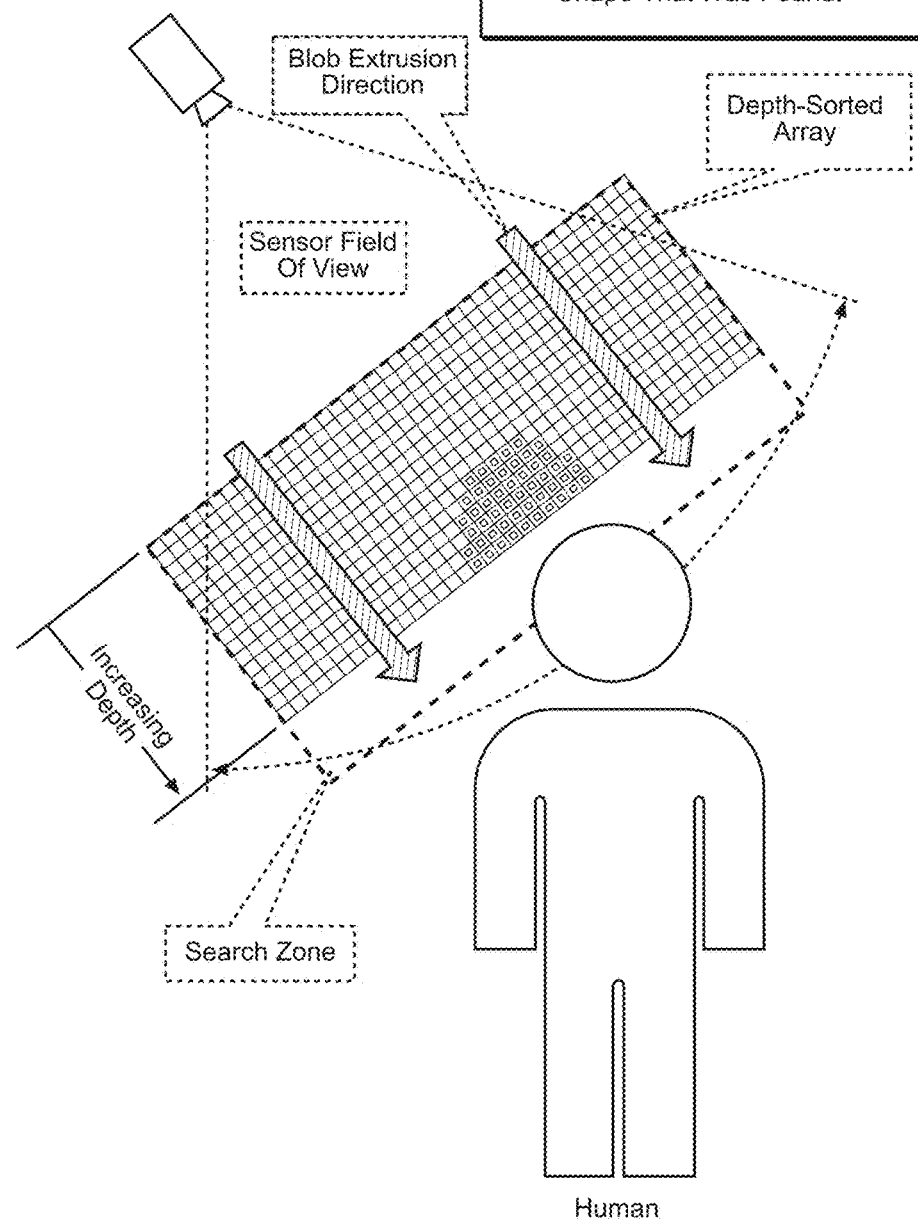

Search Criteria Info

* Search Zone
* Volumetric Criteria
   * Minimum/Maximum Volume
   * Ratio of Height to Volume Details

* Depth-sorted Array - A 3 Dimensional Sparse
   Array Where The Primary Sort Key Is Depth.
* Extrusion Involves The Incremental Collection
   Of Depth Values Yielding Volumetric Shapes.
* Volumetric Shapes Are Measured And
   Compared To Values Contained In The Search
   Criteria.
* When A Shape Matches The Criteria, The
   Extrusion Process Stops And Returns The
   Shape That Was Found.

Blob Extrusion
Direction

Depth-Sorted
Array

Sensor Field
Of View

Increasing
Depth

Search Zone

Human

FIG. 29

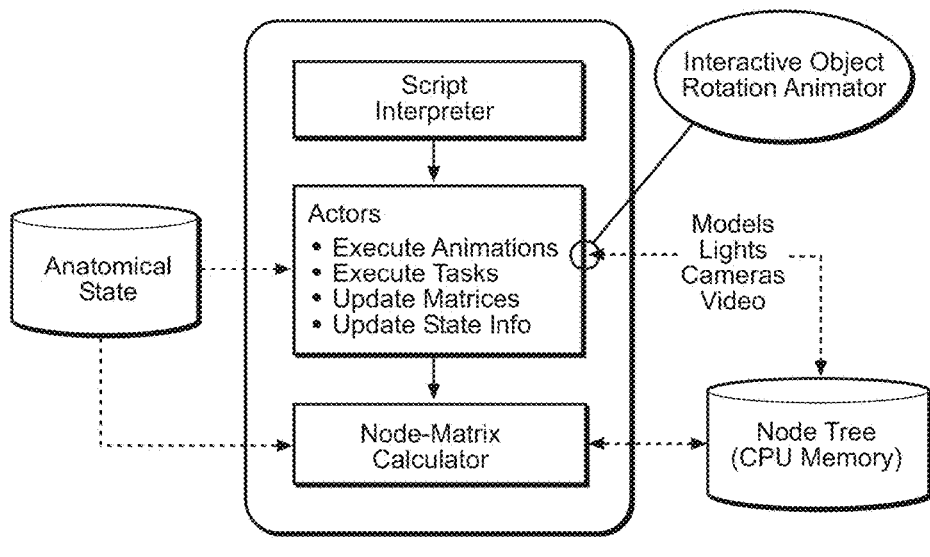

Script Interpreter

Interactive Object Rotation Animator

Anatomical State

Actors
- Execute Animations
- Execute Tasks
- Update Matrices
- Update State Info Models
Lights
Cameras
Video

Node-Matrix Calculator

Node Tree (CPU Memory)

---

Interactive Object Rotation Animator

Anatomical State

Eye Position

Determine Vector From Eye Position To Center Of Screen

Vector

Determine Yaw And Pitch Rotation Of Vector

Rotations

Matrix Multiply

Rotation Coefficients

Script Interpreter

Rotation Product

Create Multiplication Matrix

Object Rotation Matrix

Matrix Multiply

Object Rendering Matrix

Node Tree (CPU Memory)

Updated Object Rendering Matrix

FIG. 31

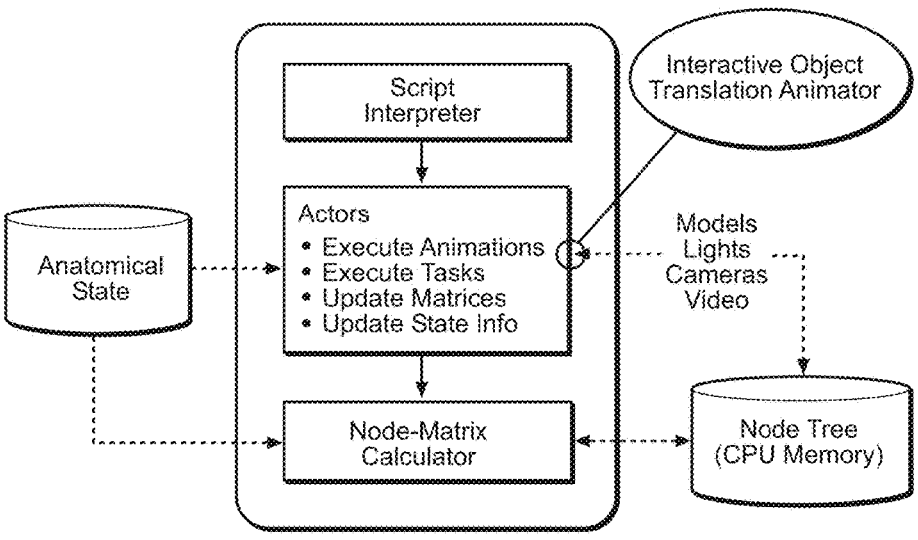
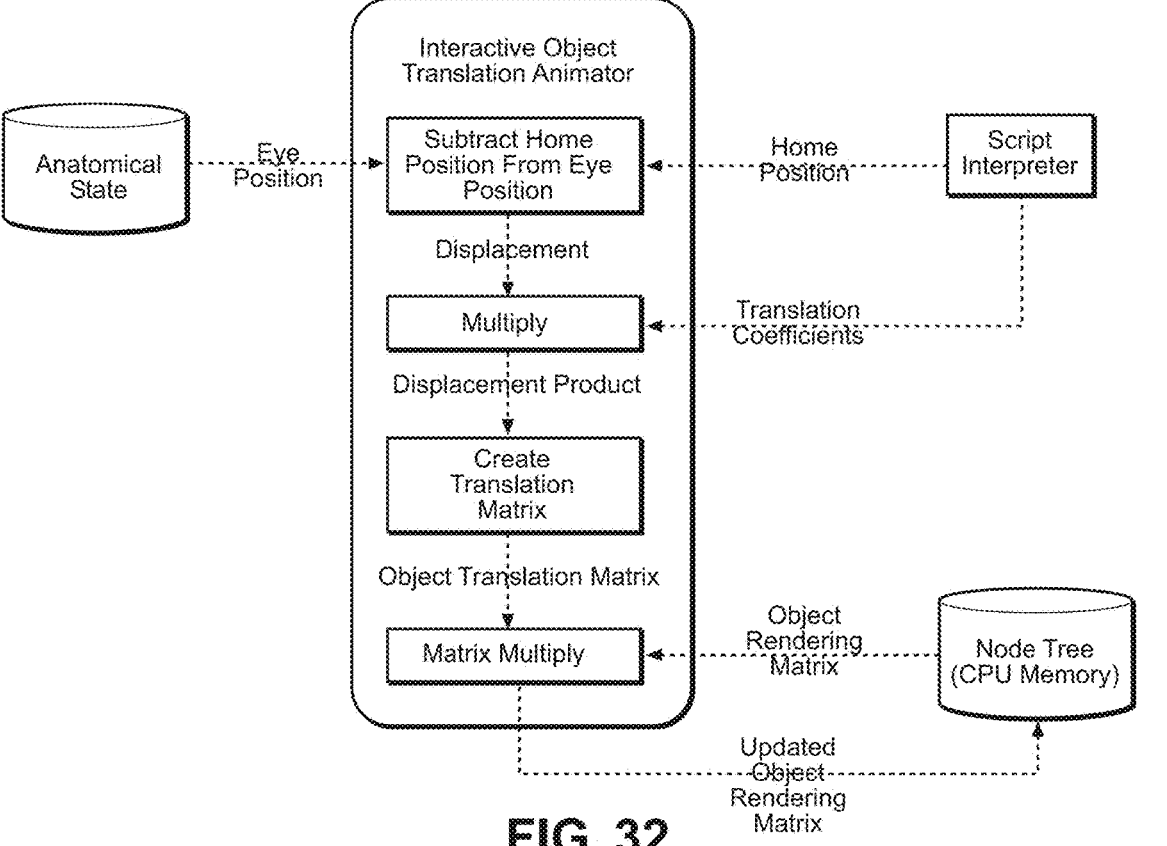
FIG. 32

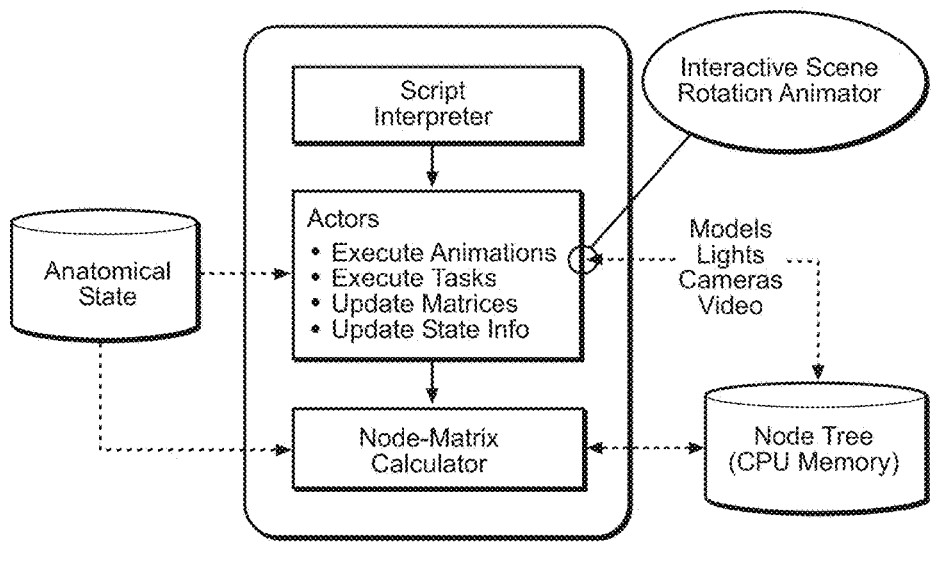
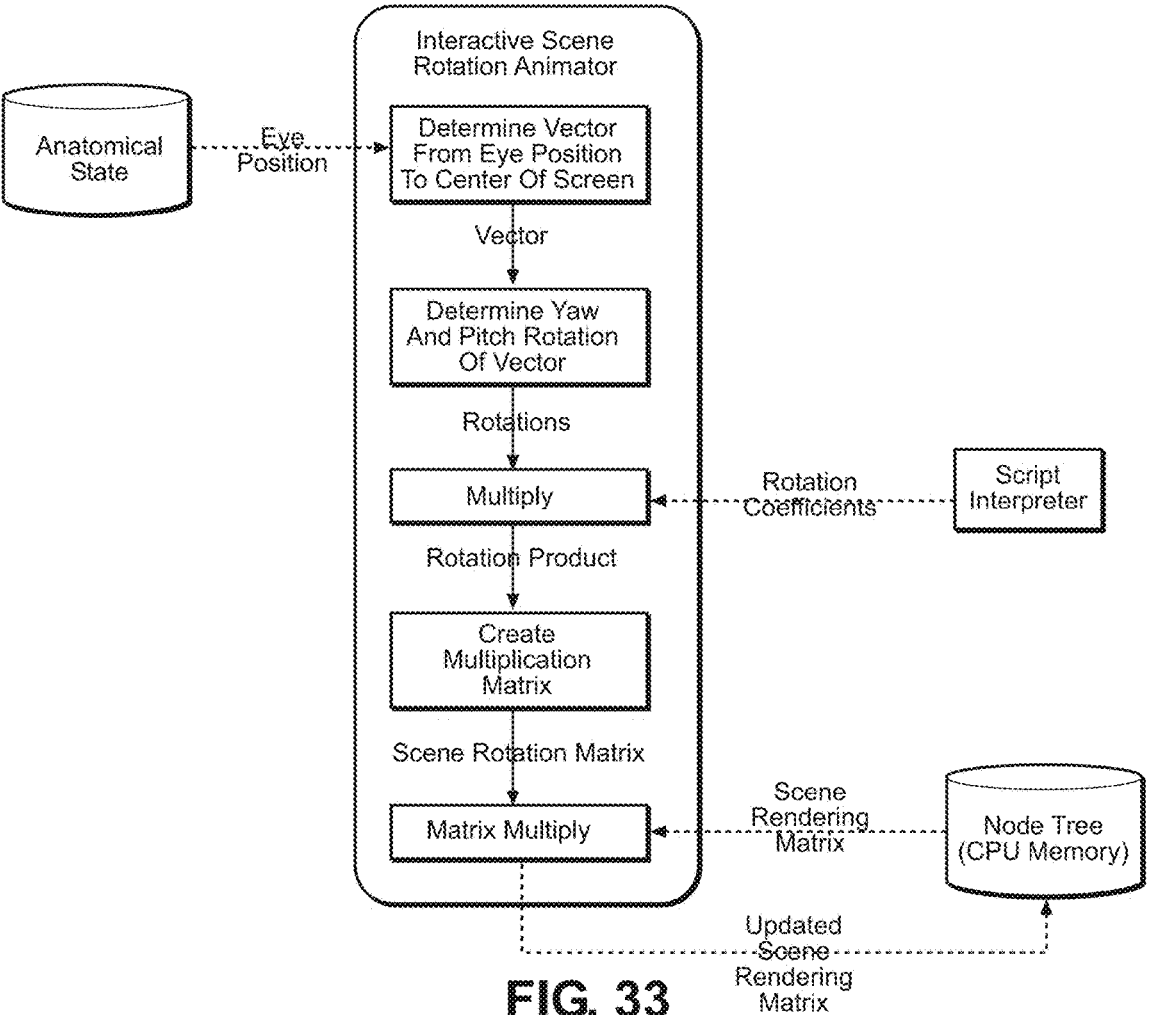
FIG. 33

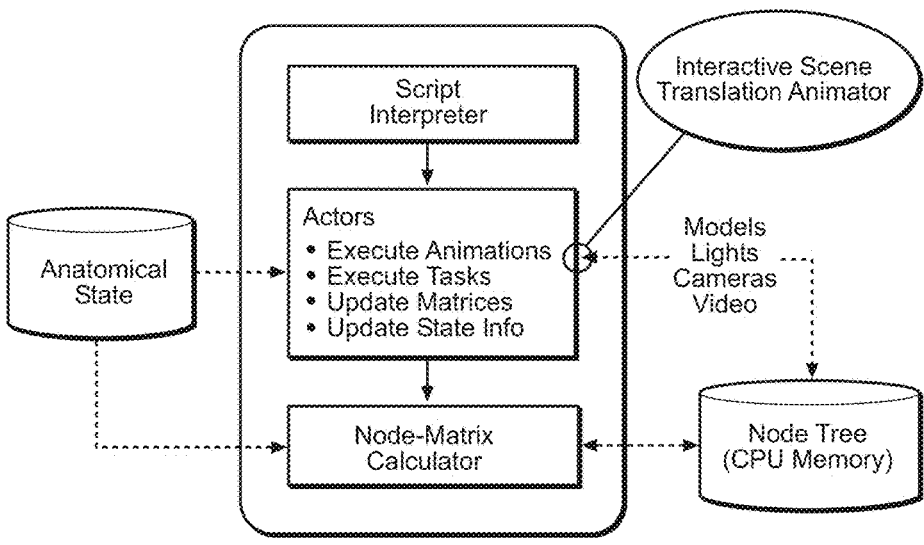
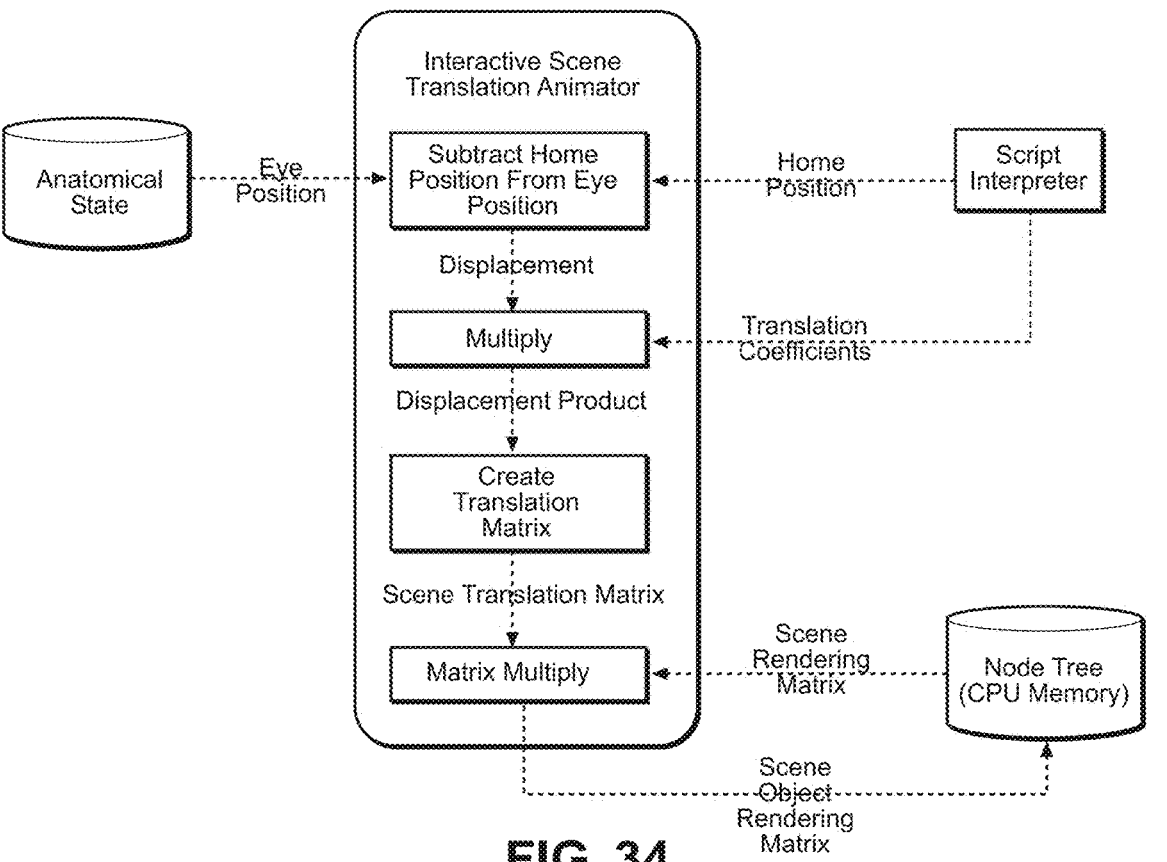
FIG. 34

SYSTEMS AND METHODS FOR INTERACTIVE VIEWING OF THREE-DIMENSIONAL CONTENT USING ANATOMICAL TRACKING

CROSS-REFERENCE TO RELATED APPLICATIONS

The present application claims the benefit of priority of U.S. provisional patent application No. 63/536,007 filed on Aug. 31, 2023. The present application is also related to U.S. patent application Ser. No. 18/478,795 filed on Sep. 29, 2023, entitled "DISPLAY OF THREE-DIMENSIONAL SCENES WITH CHANGING PERSPECTIVES", which issued as U.S. Pat. No. 12,051,149 on Jul. 30, 2024, and claims the benefit of priority to U.S. provisional patent application No. 63/412,798 filed on Oct. 3, 2022. These applications are hereby incorporated by reference in their entirety including any appendices.

BACKGROUND

The present technology relates to virtual reality (VR) systems and methods that create an immersive three-dimensional viewing experience for users. In particular, the present technology relates to systems and methods that simulate scenes of a "virtual world" and allow a user to navigate that world.

Virtual reality is a simulated experience that immerses users in a virtual world. Applications of virtual reality include entertainment (especially video games), education and training, and business such as real estate tours and office meetings. Strictly speaking, virtual reality takes place in a completely virtual environment, but may be considered as also encompassing related technologies, such as augmented virtual reality, and mixed reality, which is sometimes referred to as extended reality (XR). In augmented virtual reality, virtual objects are overlaid on a real-world environment, and in mixed reality, a virtual environment is combined with the real world.

Conventionally, virtual reality is enabled through the use of VR headsets and/or related hand-held peripherals. Although effective in many cases, they have certain qualities or requirements that form barriers to their ubiquitous use, and thereby limit access to virtual worlds.

One set of examples of these barriers are high cost, disease transmission, comfort, potential for injury, and venue limitations. More specifically, VR headsets can be cost-prohibitive for a variety of potential applications because they typically include a combination of near-eye displays, integrated audio, tracking hardware, and an on-board computing device. VR headsets, when shared between users in homes, schools, museums, workplaces, and various public venues provide opportunities or at least is perceived as a risk for the spread of disease because of the headset's inherent proximity to each user's mouth, nose, and eyes. Moreover, some users are reluctant to use VR headsets because of the risk of eye strain, nausea, dizziness, myopia, radiation exposure and/or disorientation. And finally, the use of VR headsets that require 100% immersion can make users unaware of their physical surroundings. This creates risks to both health and nearby property, making some users reluctant to use VR headsets. Likewise, utility-powered VR headsets require wiring from an outlet or computer to the VR headset. This wiring can inhibit movement, thereby also representing a risk of personal injury or damage to property. Finally, because VR headsets include integrated display components, public venues such as those employing kiosks and digital signage do not accommodate the use of VR headsets.

In addition, as mentioned above, VR devices include a combination of near-eye displays, integrated audio, tracking hardware, and an on-board computing device. Collectively, these components form a single integrated solution. However, users who already possess multi-purpose components such as display devices, computing devices, audio devices or devices that could be used for tracking purposes, are unable to leverage these as components to customize or create VR headsets. For example, a user who has a gaming computer with a new state-of-the-art GPU, is unable to use this component to replace the GPU in a VR headset.

Still further, battery powered VR headsets require periodic recharging, which represents another barrier to their wide-scale adoption.

VR solutions that require exclusive access to a user's eyes, ears and/or hands create situations where related senses are wholly or partially unable to interact with the physical world. These solutions thus impede a user's ability to freely access information from devices such as computers, smart-phones, telephones, doorbells, intercoms, television, alarms, alerts from public services, or other people in their vicinity. Thus, access to important and timely notifications may be blocked and so, the risk of missing these notifications makes some users reluctant to use currently available VR solutions.

VR headsets and the like also limit a user's ability to multitask. Specifically, users of conventional VR technology are limited in their ability to use tools including, but not limited to, appliances, hardware-related tools, cooking implements and writing implements. For example, it is not possible to safely cook while wearing a VR headset.

Accordingly, there is a need for innovative solutions in the field of VR which overcome the limitations and drawbacks of VR headsets, hand-held devices and the like.

SUMMARY

An object of the present technology is to provide a virtual window (VW) on a display and by which a user can interact with a virtual world using their own physical movements. The display may be a conventional digital image display, such as an LCD display of the type used for TVs, monitors for desktop computers, laptop computers or tablets, cell phones, kiosks, etc.

According to one aspect of the present technology, there is provided a method of creating an immersive three-dimensional viewing experience for a user, the method comprising: producing image data including a digital representation of at least part of the user, generating anatomical tracking data including by tracking relative positions of at least one anatomical feature of the user using the image data, rendering target content in such a way that that the target content is displayed on the screen of the display device in three dimensions to the user wherein the target content includes a virtual scene, a virtual object and/or a virtual character, and executing an interactive viewing mode in which a movement of the user affects changes in the rendering of, i.e., manipulates, the target content. The interactive viewing mode may be one of rotating in its entirety a virtual scene or virtual object within the scene, based on the anatomical tracking data, as the relative position of an anatomical feature of the user changes. The interactive viewing mode may also be one of translating in its entirety a virtual scene or a virtual object within the scene based on the anatomical tracking data as the relative position of an anatomical feature of the user changes. The interactive viewing mode may also be one of animating a virtual character, based on the anatomical tracking data, as the relative position of an anatomical feature of the user changes.

According to one aspect of the present technology, there is provided a method of creating an immersive three-dimensional viewing experience for a user, the method comprising: acquiring image data of a user while the user is situated in front of a screen of a display device, generating anatomical tracking data using the image data and representative of a position of an anatomical feature of the user relative to the screen of the display device such that the anatomical tracking data changes dynamically as the user moves the anatomical feature, rendering a three-dimensional (3D) model of target content and displaying the model to the user via the screen of the display device, and executing an interactive viewing mode in which the 3D model of the target content is translated or rotated relative to the user or is animated based on changes in the anatomical tracking data, whereby movement of the anatomical feature changes the rendering of the 3D model of the target content.

According to still another aspect of the present technology, there is provided a machine having a processing unit, and non-transitory computer-readable media (CRM) storing operating instructions and digital target content representing a virtual scene, a virtual object and/or a virtual character. The processing unit is configured to execute the operating instructions to: render a three-dimensional (3D) model of the target content and display the model to the user via a screen of a display device, generate anatomical tracking data using point cloud data, and execute an interactive viewing mode in which a movement of the anatomical feature of the user affects changes in the rendering of the target content and so is based on the dynamic changes in the anatomical tracking data in real time. Here, the interactive viewing mode includes at least one mode selected from the group consisting of: rotating in its entirety a virtual scene or virtual object constituting the target content as the relative position of the anatomical feature of the user changes, translating in its entirety a virtual scene or a virtual object constituting the target content as the relative position of the anatomical feature of the user changes, and animating a virtual character constituting the target content, based on the anatomical tracking data, as the relative position of an anatomical feature of the user changes.

According to still another aspect of the present technology, there is also provided an interactive viewing system for creating an immersive three-dimensional viewing experience, comprising: at least one point cloud capture device that captures images of a subject and generates image data of a three-dimensional representation of the subject, a display device having a screen, and a computer (machine) operatively connected to the at least one point cloud capture device so as to receive image data from the at least one point cloud capture device, and operatively connected to the display device so as to display material on the screen of the display device, wherein the computer has a processing unit, and non-transitory computer-readable media (CRM) storing operating instructions and digital target content comprising a virtual scene, a virtual object and/or a virtual character. The processing unit is configured to execute the operating instructions to: render a three-dimensional (3D) model of the target content and display the model to the user via the screen of the display device, generate anatomical tracking data using the image data output by the at least one point cloud capture device, and execute at least one interactive viewing mode. The anatomical tracking data is representative of the position of an anatomical feature of the user relative to the screen of the display device such that the anatomical tracking data changes dynamically as the user moves the anatomical feature.

The interactive viewing mode or modes are each one in which a movement of the anatomical feature of the user affects changes in the rendering of the target content. The interactive viewing mode(s) may be or include a mode in which a virtual scene or virtual object constituting the target content is rotated in its entirety, based on the anatomical tracking data, as the relative position of the anatomical feature of the user changes. The interactive viewing mode(s) may be or include a mode in which a virtual scene or a virtual object constituting the target content is translated in its entirety, based on the anatomical tracking data, as the relative position of the anatomical feature of the user changes. The interactive viewing mode(s) may also be or include a mode in which a virtual character constituting the target content is animated (comes alive with respect to at least one feature thereof), based on the anatomical tracking data, as the relative position of an anatomical feature of the user changes.

According to still another aspect of the present technology, there is provided a system for displaying and allowing interaction with virtual content, including hardware and software modules for creating a virtual world from media, tracking movement of one or more anatomical features of a user, displaying the virtual world to the user in three dimensions, and changing the rendering of the three-dimensional world displayed to the user based on the anatomical tracking such that a location at which the user perceives themself to be in the virtual world (i.e., relative to a virtual scene or object) changes as the user shifts one or more of their anatomical features.

Likewise, according to still another aspect of the present technology, there is provided a computer-implemented method of creating and displaying virtual content in a manner that allows a user to interact with the content, the method including rendering a virtual world in three-dimensions from media, displaying the virtual world to a user, an anatomical tracking process of tracking at least one anatomical feature of the user, and a high speed low latency process of changing the rendering of the three-dimensional world displayed to the user based on the anatomical tracking such that a location at which the user perceives themself to be in the virtual world (i.e., relative to a virtual scene or object) changes as the user shifts one or more of their anatomical features.

The anatomical features of a user may be tracked using at least one cloud capture device including a three-dimensional type of camera(s), or a webcam(s) and software for converting the output of the webcam(s) to a 3D model of the images captured by the webcam(s).

The virtual world may be rendered "on" a flat or curved screen of a display device. The virtual world may be rendered from media selected from the group consisting of 3D models, images, scenes, sound, animation, and various forms of simulated lighting. Such media includes but is not limited to renderings created by artists using authoring tools, renderings created by scanning an image or object using a 2D or 3D scanner, recorded or live streamed still images or video.

The present technology may have one or more of the following advantages. A virtual window (VW) created according to the present technology using a display has no barrier between objects contained outside the window and objects contained inside the window, i.e., content making up the virtual world. The content can be viewed on either side of a VW. Content can also straddle the window. A user can interact with the content through natural physical movements. These interactions may be categorized as interactions which affect the user's field of view, and interactions with content (one or more objects contained in the virtual world).

BRIEF DESCRIPTION OF THE DRAWINGS

FIGS. 1-5 illustrate a basic application of the present technology to changing the perspective of a virtual scene using anatomical tracking, wherein FIG. 1 is a conceptual diagram of the scene showing an eye position (EP) of a viewer at a home position relative to the virtual scene, and FIGS. 2, 3, 4 and 5 are each a conceptual diagram showing a respective example of how the rendering of the virtual scene displayed to the user changes as the user changes his or her eye position (EP);

FIGS. 6-15 illustrate examples of a method or methods of advanced modes of viewing three-dimensional content according to the present technology, wherein FIGS. 6, 9 and 12 are each a conceptual diagram showing a virtual scene being rendered via a screen of a display device to a user, and FIGS. 7, 8, 10, 11 and 13-15 are each a conceptual diagram showing an example of a respective advanced mode of viewing three-dimensional content;

FIGS. 16-23 illustrate an example of a system and application modules thereof including non-transitory computer readable media (CRM) for interactive viewing using anatomical tracking according to the present technology, wherein FIG. 16 is a block diagram of an example of a system for interactive viewing of three-dimensional content using anatomical tracking, FIG. 17 is a block diagram of a machine of the system of FIG. 16, illustrating non-transitory computer readable media (CRM) and a method of providing an interactive viewing experience using anatomical tracking, and FIGS. 18, 19, 20, and 21, are block diagrams of examples of more detailed portions of the system of FIG. 17, respectively, illustrating various routines and subroutines in an example(s) of a method of interactive viewing of three-dimensional content using anatomical tracking, FIG. 22 is a flow chart of a process of avoiding "virtual" collisions between the user and content being displayed to the user during interactive viewing of the content, and FIG. 23 is a flow chart of a process by which a user is selected for anatomical tracking during interactive viewing;

FIGS. 24-30 illustrate examples of processes used for anatomical tracking according to the present technology, wherein FIG. 24 is an explanatory diagram of an algorithm executed for anatomical tracking, FIG. 25 is an explanatory diagram of one example of anatomical tracking that can be executed by the algorithm, FIG. 26 is an explanatory diagram of a routine for finding a user's head in the process of anatomical tracking, FIG. 27 is an explanatory diagram of a routine for finding a user's hand in the process of anatomical tracking, FIG. 28 is an explanatory diagram of a routine for finding a user's finger in the process of anatomical tracking, FIG. 29 is a conceptual diagram of a process for finding a blob in an image captured in the process of anatomical tracking, and FIG. 30 is a flow chart of the blob finding process; and FIGS. 31, 32, 33, 34, 35 and 36 are each an explanatory diagram of a respective animator of the system of FIG. 16 comprising the operating instructions (formulae) used to change the rendering of the target content based on the anatomical tracking data in executing various viewing modes according to the present technology.

DETAILED DESCRIPTION

Figure 1:
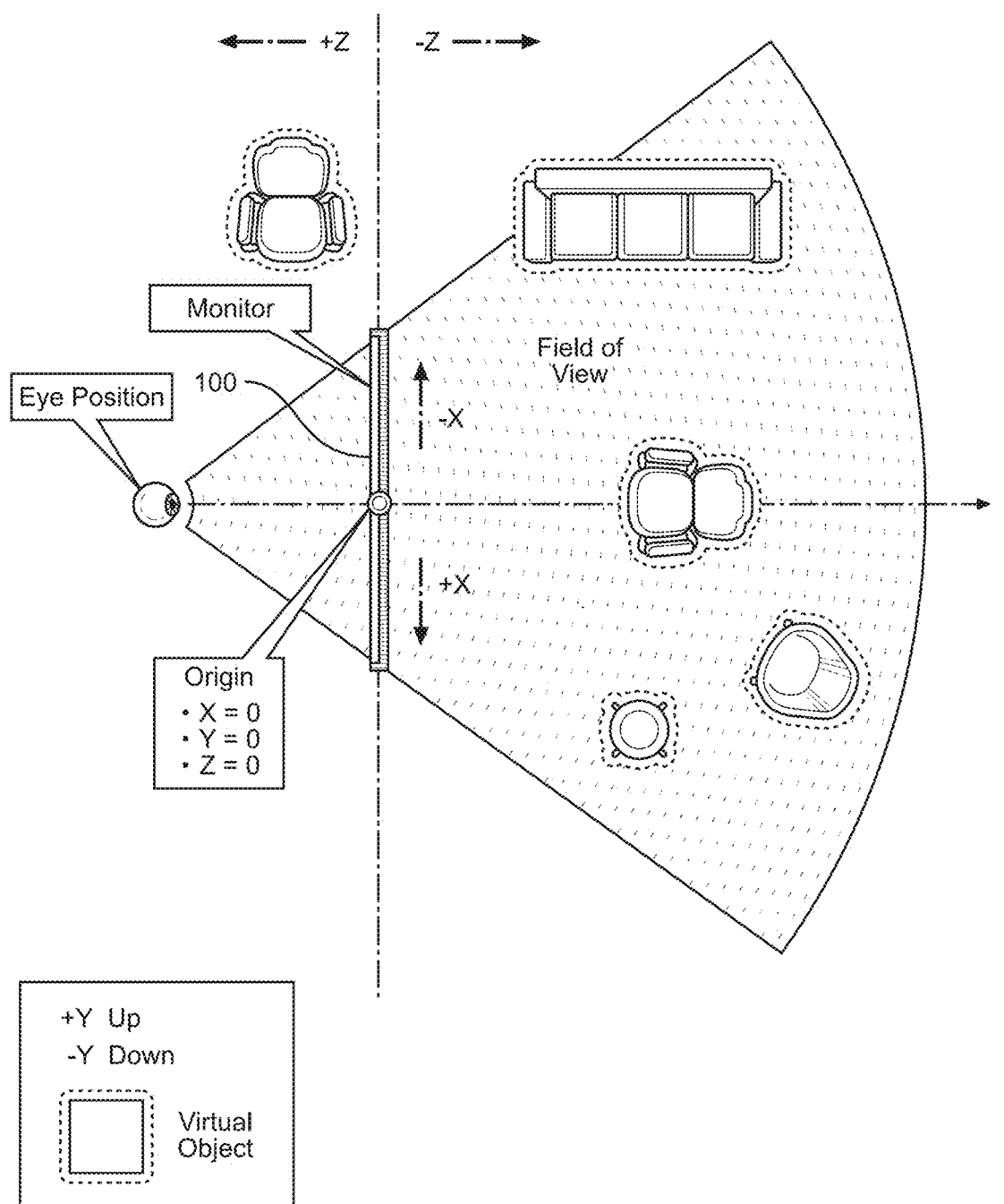

Embodiments of the present technology and examples thereof will now be described more fully in detail hereinafter with reference to the accompanying drawings. In the drawings, elements may be shown schematically for ease of understanding. Also, like numerals and reference characters are used to designate like elements throughout the drawings. Also, particular ones of the drawings include formulas or functions for carrying out a particular task or routine, such as for object translation or rotation, but such formulas or functions are exemplary only. For instance, a function may be indicated in a figure as linear, but other examples of the present technology can be realized using a non-linear function of similar variables. Furthermore, the scenes used to illustrate viewing modes according to the present technology are shown in two dimensions (e.g., in an X-Z plane) for ease of illustration. However, it will be readily apparent that the rotations or translations of the scenes using the present technology may also occur in a plane orthogonal to the sheets of these figures (the Y-Z plane) to facilitate an immersive interactive viewing experience in three dimensions. That is, in examples of the present technology, the pitch and yaw of rendered objects or scenes in translation or rotation change in response to anatomical tracking data.

Certain examples of the present technology may be described and illustrated in terms of blocks, including that of a "computer", which carry out a disclosed function or functions. These blocks, which may be referred to herein as modules or the like, are physically implemented by analog and/or digital circuits such as logic gates, integrated circuits, microprocessors, microcontrollers, memory circuits, passive electronic components, active electronic components, optical components, hardwired circuits and the like, and may be driven by firmware and/or software implemented in hardware or as operating instructions non-transitory computer readable media (CRM). In the present disclosure, the term non-transitory computer readable media (CRM) refers to any medium that stores data in a machine-readable format for short periods or in the presence of power such as a memory device or Random Access Memory (RAM). The circuits may, for example, be embodied in one or more semiconductor chips, or on substrate supports such as printed circuit boards and the like. The circuits constituting a block may be implemented by dedicated hardware, or by a processing unit (e.g., one or more programmed microprocessors and associated circuitry), or by a combination of dedicated hardware to perform some functions of the block and a processor to perform other functions of the block. The term processing unit may also refer to several processors, e.g., one or more CPUs and/or GPUs. Each block of the examples may be physically separated into two or more interacting and discrete blocks and conversely, the blocks of the examples may be physically combined into more complex blocks while still providing the essential functions of the present technology.

The terminology used herein for the purpose of describing embodiments of the present technology is to be taken in context. For example, the term "comprises" or "comprising" when used in this disclosure indicates the presence of stated features or steps in a process but does not preclude the presence of additional features or steps. The terms user, active user and viewer may be used interchangeably. Likewise, the terms world, virtual world, virtual scene and target content may be used interchangeably. These terms as context will make clear can be used to refer to simply a virtual three-dimensional (3D) rendering of an object, of an entire scene of multiple objects and/or of a character. For instance, the object or character constituting the target content may appear alone or within a virtual scene. Similarly, the term virtual window (VW) will be understood as the display of a virtual world "on" a screen of a display device, even though the virtual window (VW) may appear to the user as existing on opposite sides of the surface of the screen. Anatomical tracking data will be understood as referring to data representative of the position(s) of one or more anatomical features of a user, relative to a screen, as detected in real time or inferred from 3D imaging of the user. The acronym EP will refer to a user's eye position in space. The term virtual object (VO) will refer to any object that can be represented by a 3D model of a collection of vertices (points) or a punctual light position represented by a single point. The term Canvas (CANVAS) refers to a rectangular region corresponding to screen position. The term Home Position (HOME) refers to the center of a CANVAS. The acronym HHD refers to a handheld device. And the acronym PCCD refers to a point cloud capture device. As is known in the art, per se, a PCCD captures a collection of points each representing the position of a respective part of an object in space.

Interactive viewing of three-dimensional content according to the present technology basically includes producing anatomical tracking data representative of the movement of one or more anatomical features of a user, virtual window (VW) creation or "rendering" using provided media content to create a virtual scene or object, and manipulation of the scene or object (namely, translation or rotation of an entire scene or virtual object appearing alone or within a scene) in response to the anatomical tracking data such that the user perceives his or her self to be at a different position with respect to the scene or object. A system of interactive viewing according to the present technology uses at least one 3D camera (a camera having a 3D depth sensor) for imaging the user to provide digital image data by which the at least one anatomical feature of the user can be tracked, a display by which the virtual window (VW) is displayed to the user, and a computer operatively connected to the at least one 3D camera and display. The computer may comprise non-transitory computer readable media (CRM) having instructions by which the virtual scene is manipulated based on input of the anatomical tracking data.

Interactive viewing of the scene being displayed allows a virtual window (VW) to increase visible access by a person viewing the VW to a virtual object(s). In interactive viewing, the user's position in relationship to the center of the screen plane (center of pixel array) is represented as a vector which is used as input. This vector can be used to provide the user with an unlimited field of view and/or unlimited viewing position and can be used to control the spatial position and rotation of the object(s) composing the scene. With respect to the former, for example, interactive viewing of a scene produced in a VW according to the present technology can provide a complete 360-degree field of view of a scene, unlike (flat) physical windows that limit us to a 180-degree field of view. The scene being viewed using a VW can be automatically moved in 3 dimensions as an anatomical feature(s) of the viewer shifts (changes position) according to the present technology, thereby providing visibility beyond the range allowed for by a physical window. With respect to the latter, the vector can be used to automatically rotate a virtual object in response to changes in position of a user's anatomical feature(s) to provide 360-degree visibility of the object. The vector can be used to automatically cause the scene to pan horizontally, vertically, or depth-wise, in response to changes in position of a user's anatomical feature(s), to allow the user to focus on specific objects within a 1-, 2- or 3-dimensional grid of objects.

Anatomical tracking data can also be used for other purposes. Examples include but are not limited to animating a virtual character or making certain choices related to the scene. More specifically, a virtual character could be animated to focus their attention on the viewer through direct 3D eye contact of the user with the character, as discerned from the anatomical tracking data. This is useful in cases in applications that require the viewer's attention, such as in the promotion and sales of various products and services. The anatomical tracking data, when representative of a user moving towards a virtual object, can result in the magnification of the object for the user, allowing its closer inspection, or can trigger a display of more information about the object.

Another mode of operation that may be adopted in the present interactive viewing technology is "collision prevention," In collision prevention mode, a virtual object is automatically displaced away from a user if a change in anatomical position of a feature(s) of the user would otherwise trigger a collision between the user's perceived position and the virtual object. In other words, the position of the virtual object relative to the position of the view is automatically changed to avoid overlap. This is useful and necessary in cases in which virtual objects are not designed for internal viewing.

These and other features and advantages of the interactive viewing technology according to the inventive concept will now be described in more detail.

Anatomical Tracking and Virtual Window Paradigm

An example of a paradigm for anatomical tracking and creating a virtual window (VW) on a scene whose perspective changes when the position of an anatomical feature(s) of a user changes, which can serve as basic application of the present technology, is described by the Applicant in their above-referenced U.S. Pat. No. 12,051,149 entitled DISPLAY OF THREE-DIMENSIONAL SCENES WITH CHANGING PERSPECTIVES which issued as issued on Jul. 30, 2024, and the contents of which were incorporated by reference. In this technology, anatomical tracking is used to determine changes in position of a user's anatomical feature(s) relative to a screen and data generated by the anatomical tracking is used to change the perspective of the scene in the virtual window (VW) in correspondence with change in the viewer's body position.

In examples of this paradigm shown in FIGS. 1-5, the rendering of the virtual scene to the user is changed to offer a new perspective of the scene, based on a change in EP. In these examples, a change in the position of the head of the user relative to a screen 100 of a display device, such as a monitor, may be tracked and changes in EP of the user may be inferred from the detected changes in head position. Also, in these examples it is to be noted that the virtual objects do not appear closer or further away from the user as the user shifts his or her eye position (EP). Only the user's perspective of the virtual scene changes.

The paradigm relies on a unified world Cartesian coordinate system in which, the virtual space domain has negative Z coordinates, the physical space domain has positive Z coordinates, and the plane of the screen (plane of pixels of a digital display) corresponds to the X-Y plane, and a center of the plane of the screen has X, Y and Z coordinates equal to zero (the origin of the coordinate system). Virtual objects (typically 3D models created from media content using processes known, per se, and which make up the virtual scene) can be rendered to appear in virtual space, physical space, or both. Objects can also straddle the plane of the screen 100. In one example, a point-cloud capture device plus anatomical tracking algorithms determine a viewer's eye position (EP). The EP is used to determine a dynamic viewing position. The coordinates mapped on the screen of the display are used to construct a flat rectangular frustum coincident with the plane.

The rendering of the virtual scene entails creating vectors for each pixel. Vectors originate at the viewer's eye position (in physical space) and point towards corresponding pixel locations in the frustrum. (The viewer's eye position can be projected through a curved rectangular frustrum to determine vectors towards virtual content for curved display devices.) Color values for each pixel are determined by finding intersections with surfaces, and then applying material-based and lighting-based rendering algorithms for each, in a process known as shader-based rendering.

An example of tracking a user's anatomical feature(s) according to the present technology and based on the above-described anatomical tracking paradigm will now be described in more detail.

According to an aspect of the present technology, anatomical tracking is used to detect changes in position of an anatomical feature(s) of a viewer (head, hands, elbows) and infer changes in relative position of an anatomical feature such as the user's eyes (eye position (EP)) or finger with low latency. The anatomical tracking process is used to move the virtual world in a specified way (mode) with hardly any perceived delay between the viewer's motion and resulting changes in scene displayed by the VW. The latency of the overall process is consistent with the nature of viewing a scene through a real window on the world.

The anatomical tracking process according to the present technology may include an initial step of defining a cuboid near the screen 100 of the display as an entry zone (field of view) using a 3D machine vision camera, detecting through conventional image recognition whether a person's head is in the entry zone, and designating as the "active user" a person whose head is detected in the entry zone. If the person's head leaves the entry zone and someone else's head appears in the entry zone, this new person is designated as the active user. This process and associated components (processor and memory) will be described in more detail with respect to FIG. 23.

In one example of the anatomical tracking process, one or more point cloud capture devices are provided to designate the active user and generate point cloud data of anatomical features of the user. High performance point cloud stitching is executed when multiple point cloud capture devices are used. Candidate positions (both locations and shapes) via Z-Order stacking and extrusion of point cloud data are determined at a high speed. Eye position (EP) and elbow positions are inferred based on apparent viewer height, head, and hand positions. Positions of anatomical feature(s) (head, hands, fingers) are determined at a high speed using moving cuboids. Variable latency temporal smoothing is used to stabilize the anatomical positions with high speed, low latency. When the point cloud contains marginal data, anatomical positions are inferred.

In another example of the anatomical tracking process, one or more web cameras (webcams) is provided to designate the active user and capture video of anatomical features of a user. A webcam will deliver key points of two-dimensional image information and so, an image capture device according to this example will include a processor configured to convert two-dimensional image data into point cloud data. Image stitching is executed when multiple webcams are used. Candidate positions (both locations and shapes) are determined using image recognition-based body tracking. Positions of anatomical feature(s) (head, hands, fingers) are determined at a high-speed using moving cuboids. Variable latency temporal smoothing is used to stabilize the anatomical positions with high speed, low latency.

Figure 2:
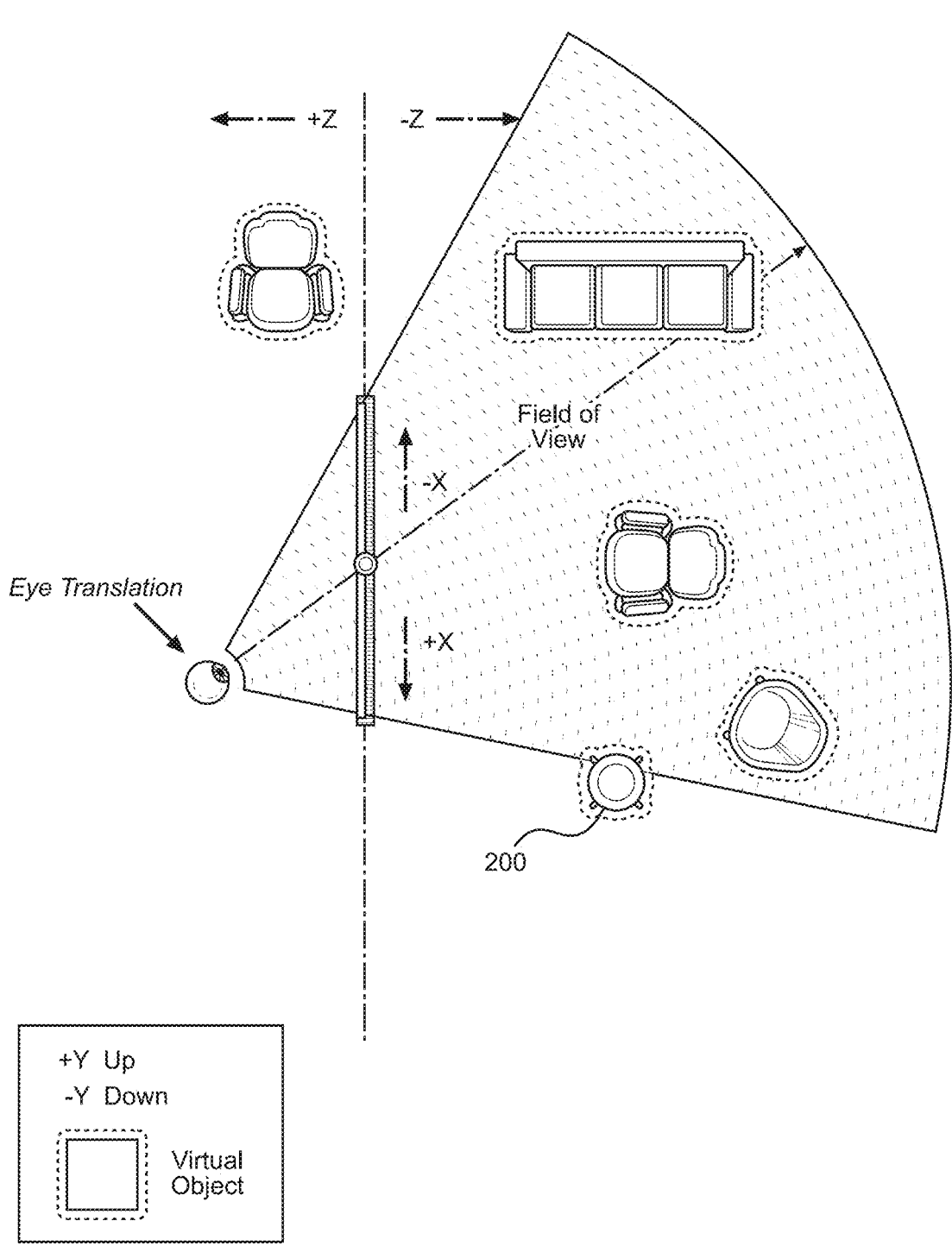
Figure 3:
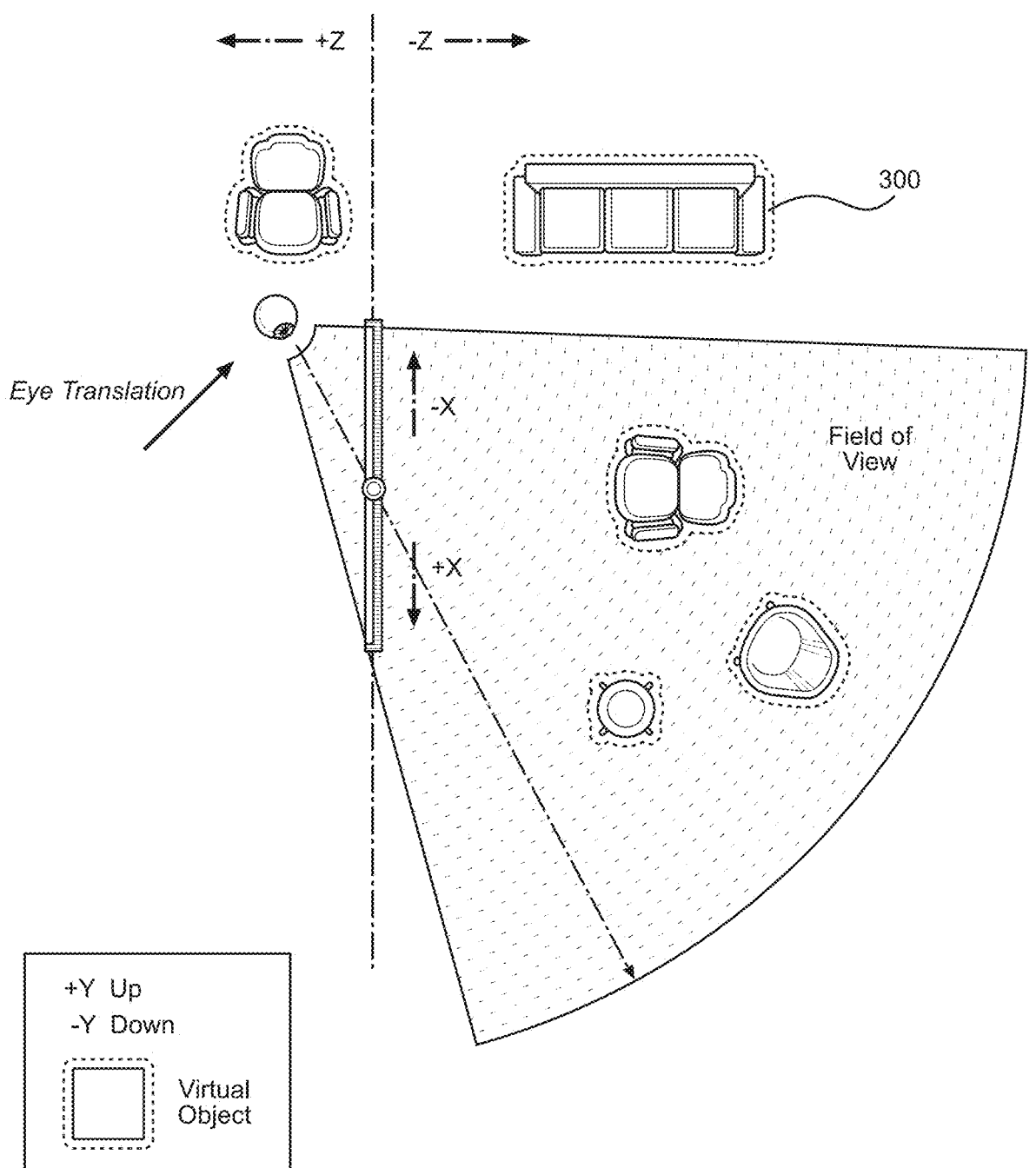

The examples of FIGS. 2 and 3 show how the rendering of the virtual scene changes as the EP of the user is displaced in plus and minus directions of the X axis, respectively, to rotate the field of view of the virtual scene by the user in the X-Z plane. Accordingly, some of the virtual objects, like virtual object 200 in FIG. 2 or virtual object 300 in FIG. 3, are no longer rendered or are only partially rendered as they "disappear" from the field of view.

Figure 4:
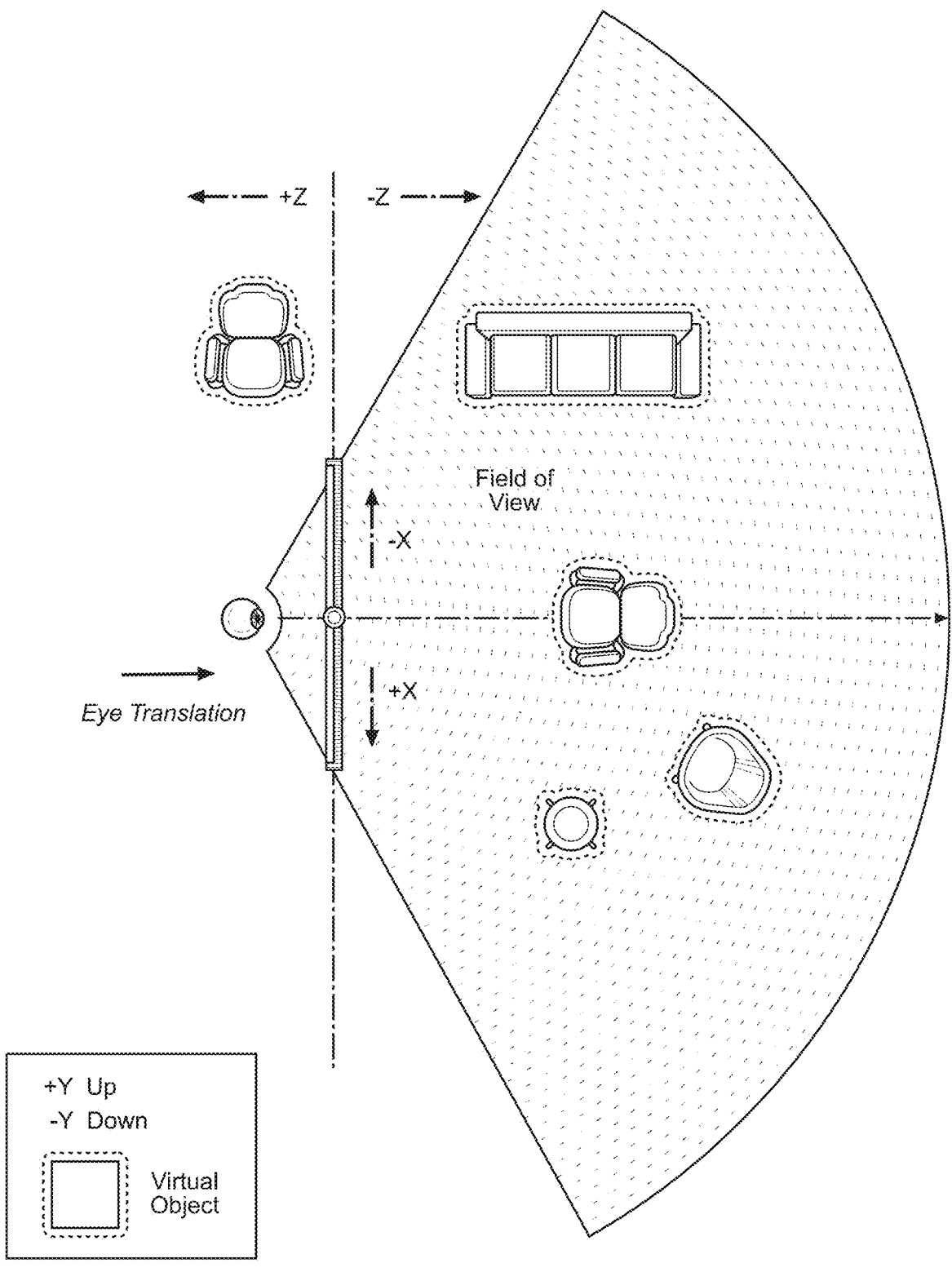
Figure 5:
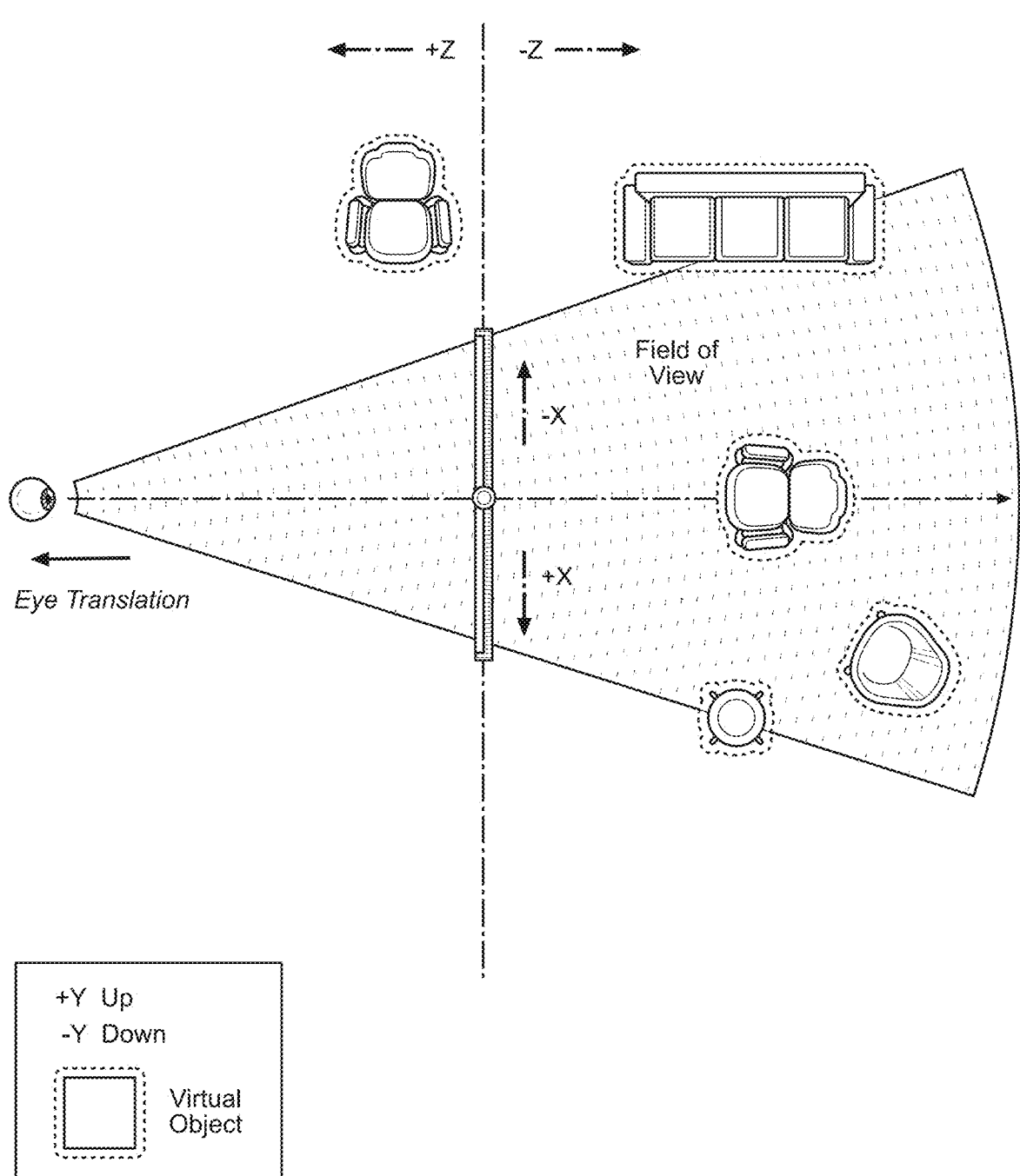

The examples of FIGS. 4 and 5 show how the rendering of the virtual scene changes as the EP of the user is displaced in plus and minus directions of the Z axis, respectively, to expand and contract the field of view of the virtual scene by the user in the X-Z plane. Accordingly, in this example when the user shifts their EP in the plus Z direction, some of the virtual objects (e.g., objects designated by reference numerals 200 and 300 in FIGS. 2 and 3) are no longer rendered or are only partially rendered as they "disappear" from the field of view.

Interactive Viewing Modes

Reference will now be made to FIGS. 6-15, which illustrate various "advanced modes" of viewing three-dimensional content according to the present technology, which create an immersive experience in which the viewer (i.e., the user) perceives him or herself to be moving in a virtual world relative to the target content. As was alluded to above, there are two forms of target content for the advanced viewing modes: the entire scene or one or more three-dimensional models (e.g., virtual objects, a virtual character) displayed within a scene. Examples of the advanced viewing modes that a user can access employing a system of interactive viewing and that are executable using non-transitory media CRM according to the present technology, are: hyper-rotation, hyper-translation, sticky hyper-rotation, and sticky hyper-translation, and object animation modes.

Figure 6:
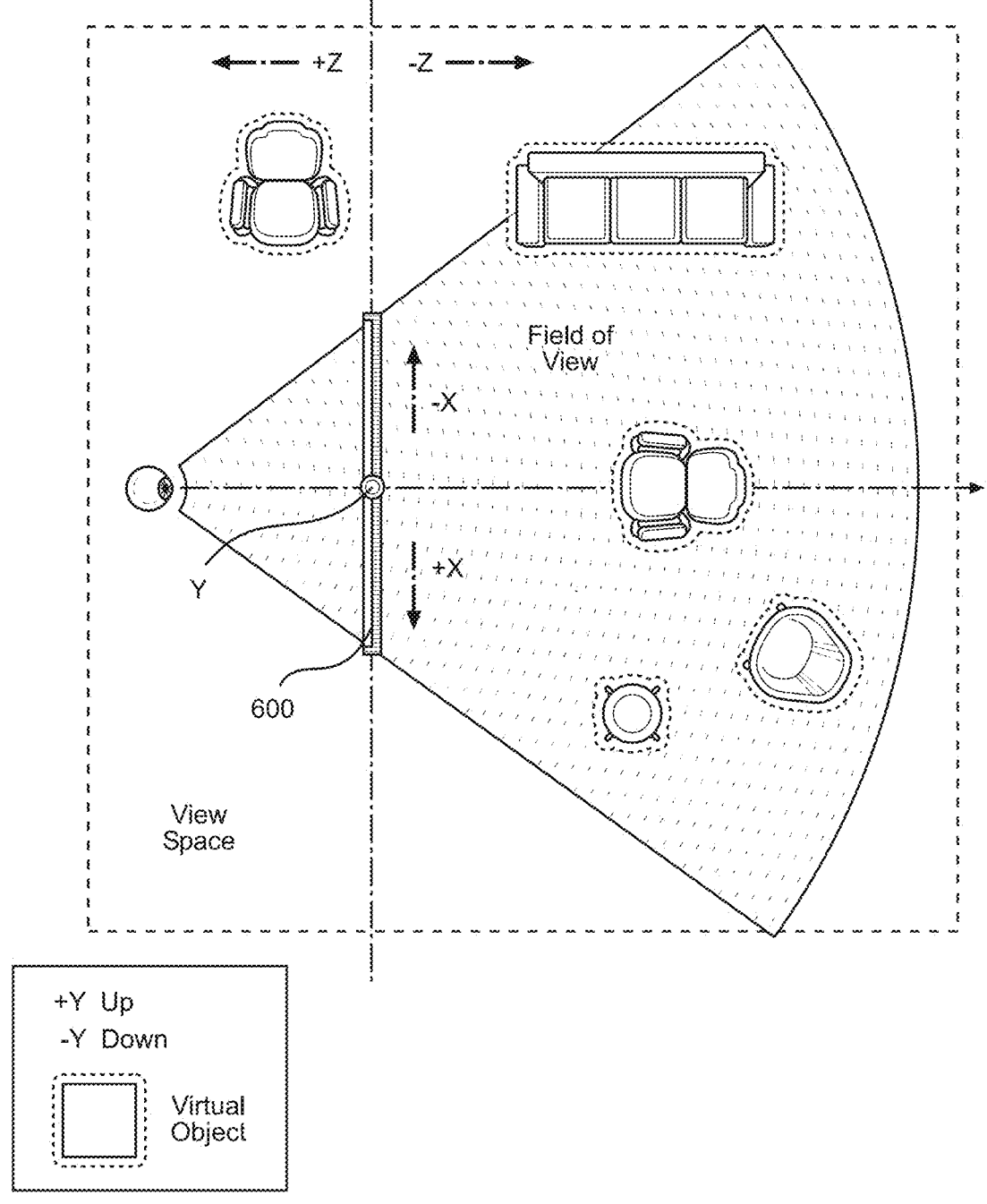
Figure 8:
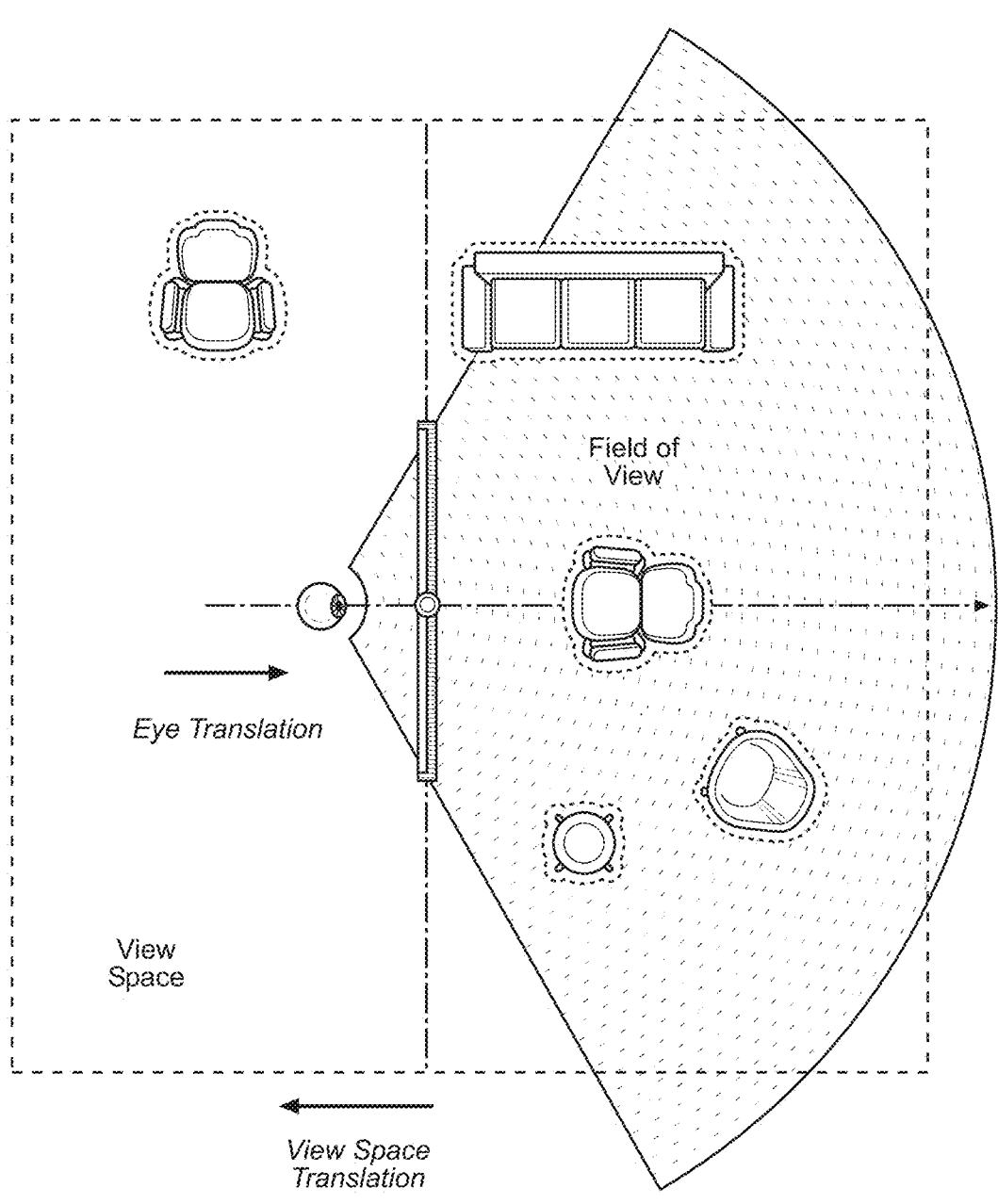
Figure 9:
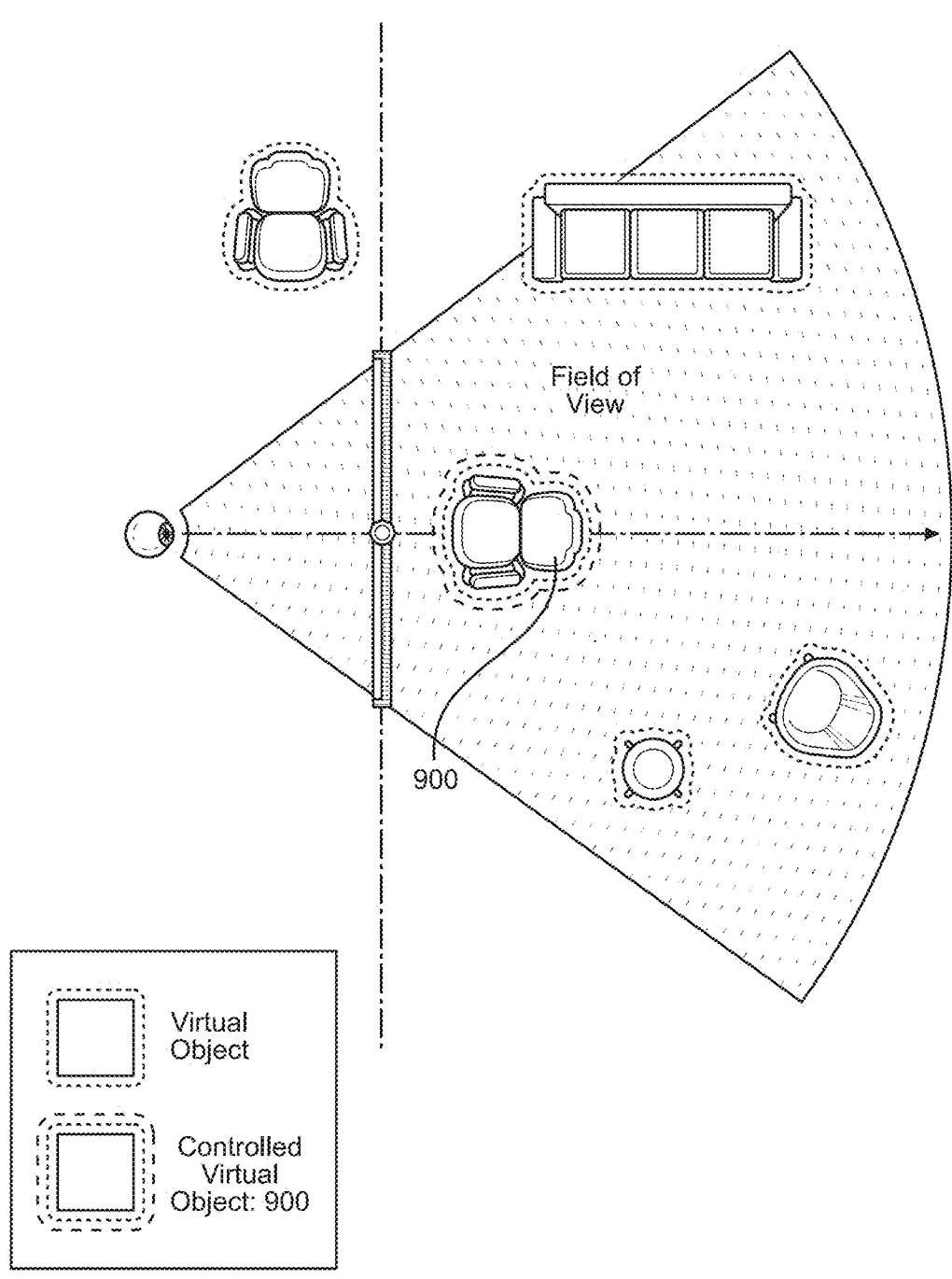
Figure 11:
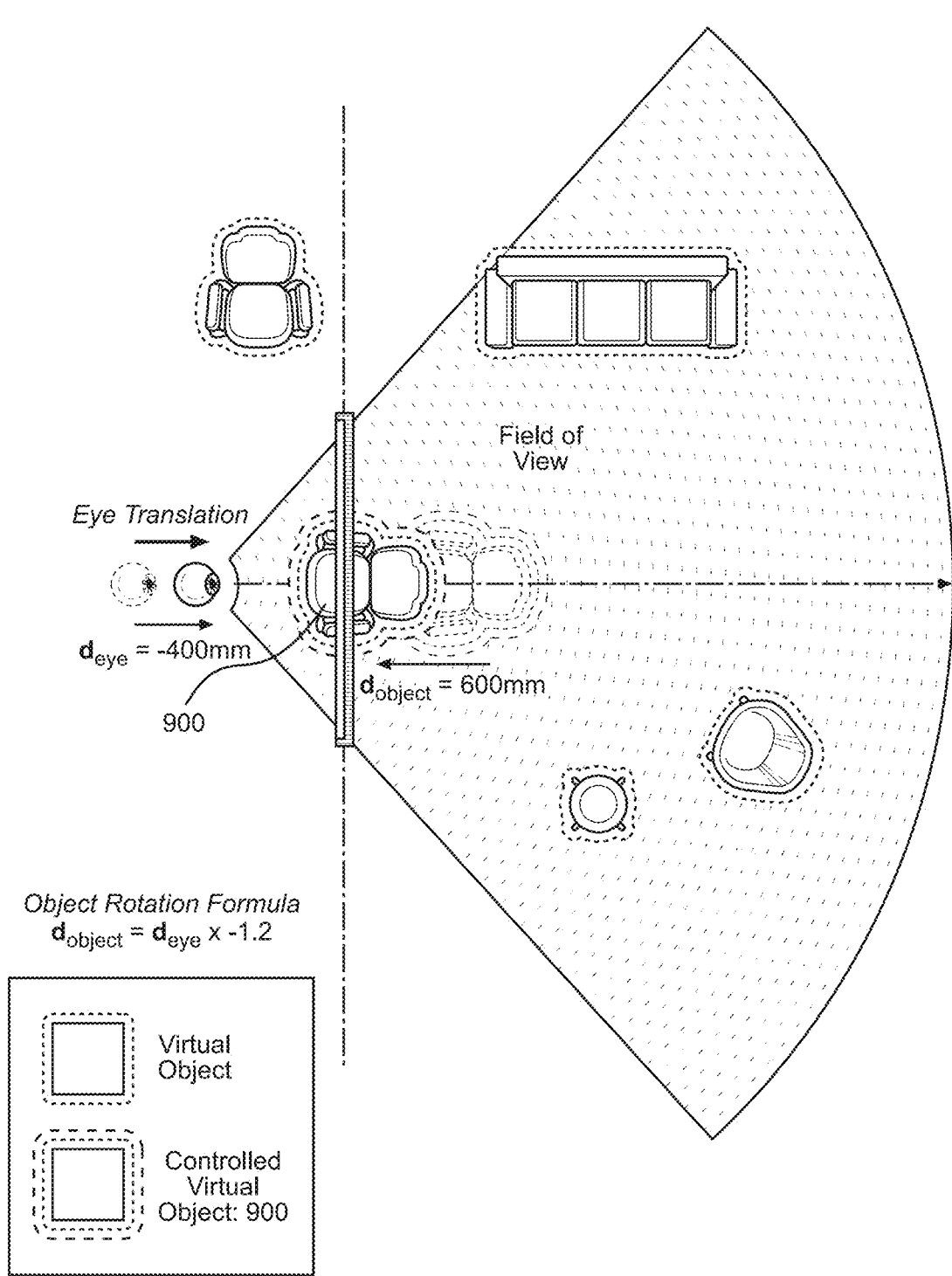
Figure 12:
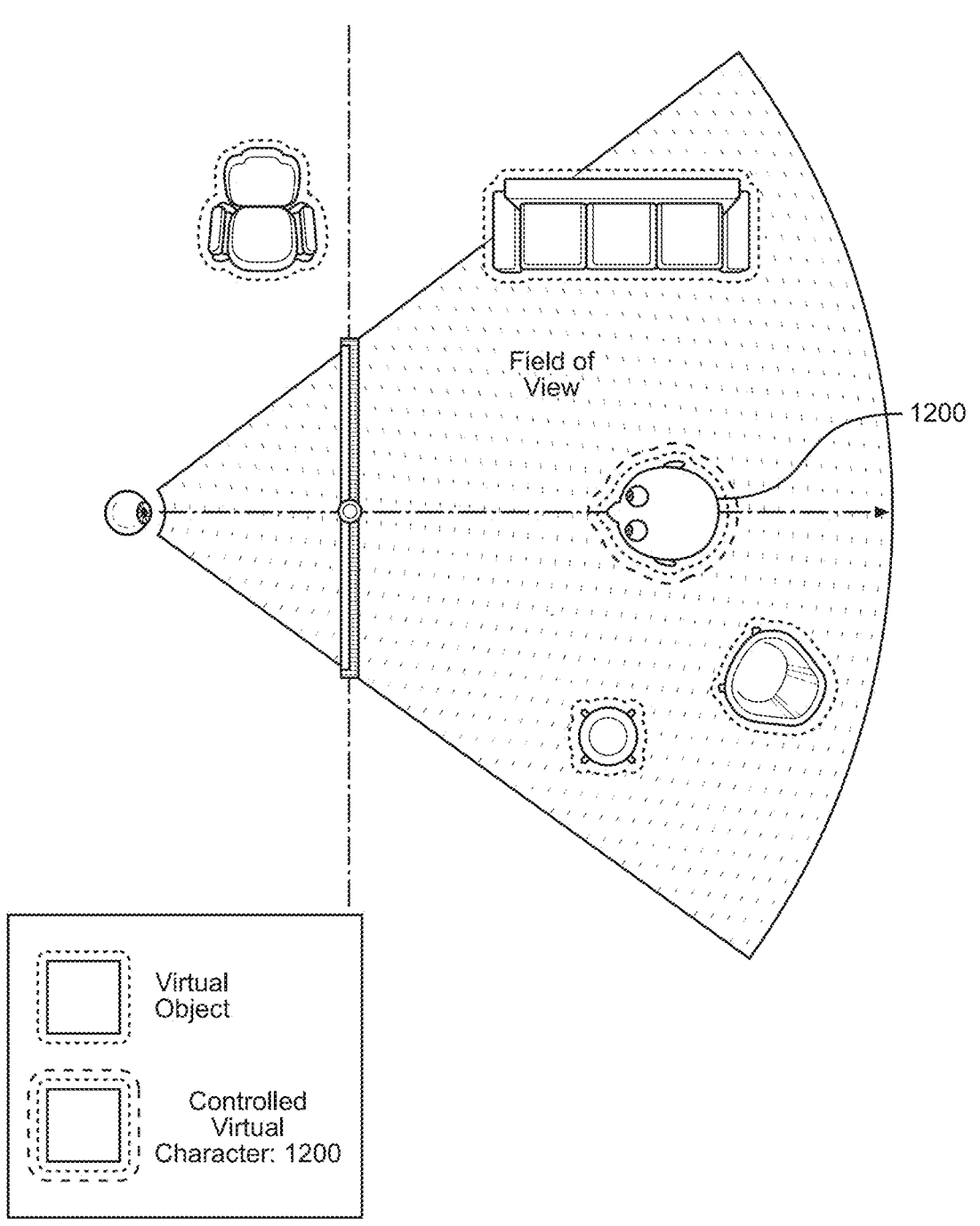
Figure 13:
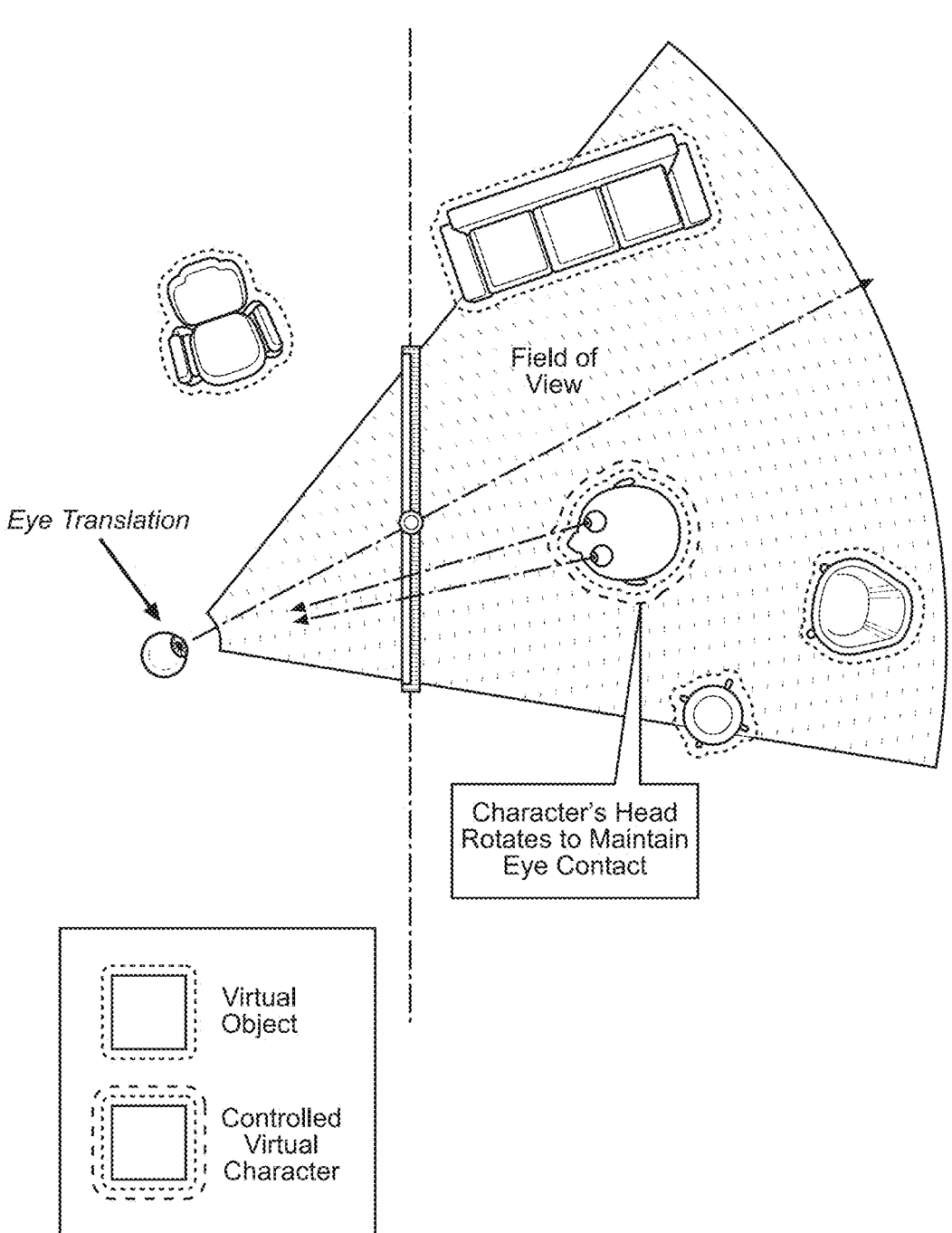
Figure 14:
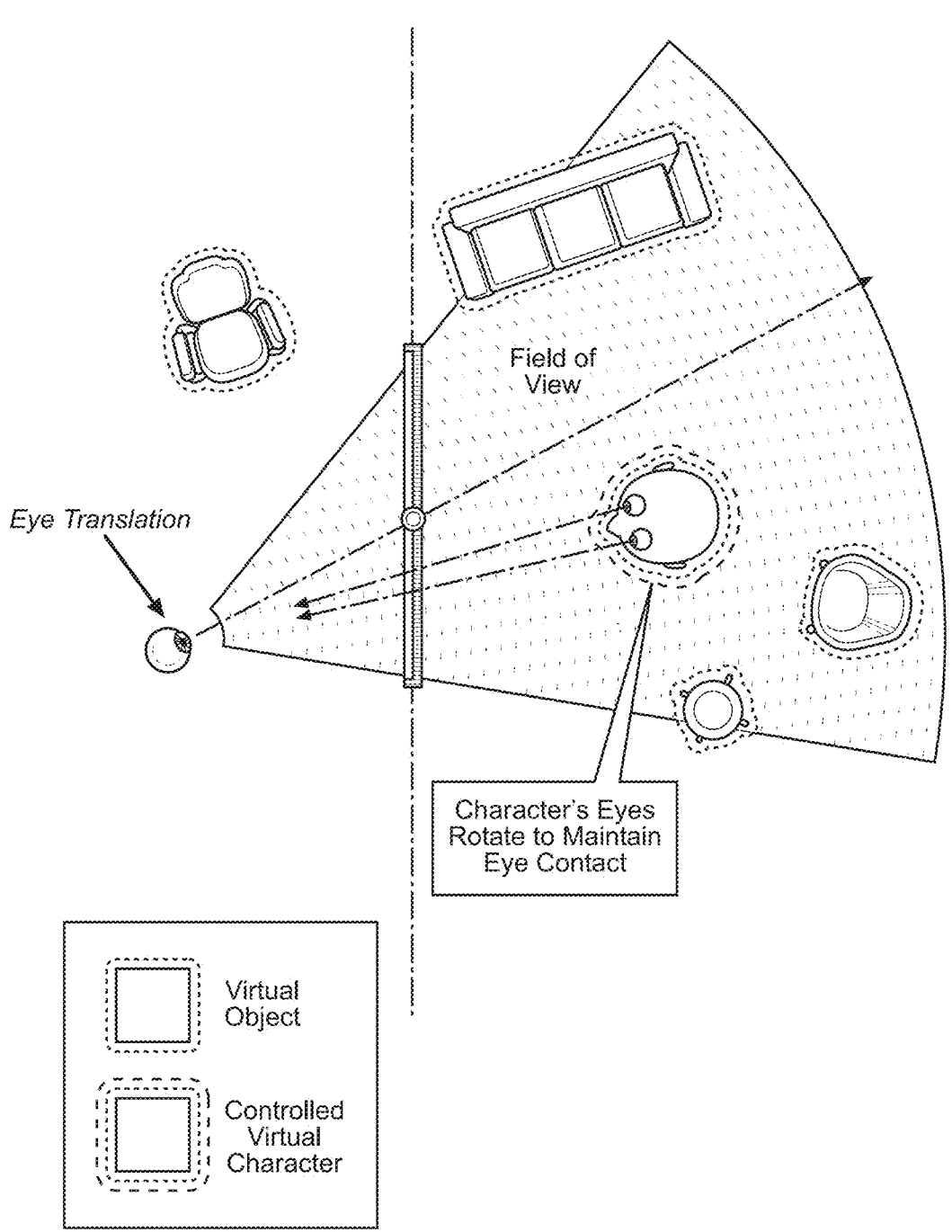
Figure 15:
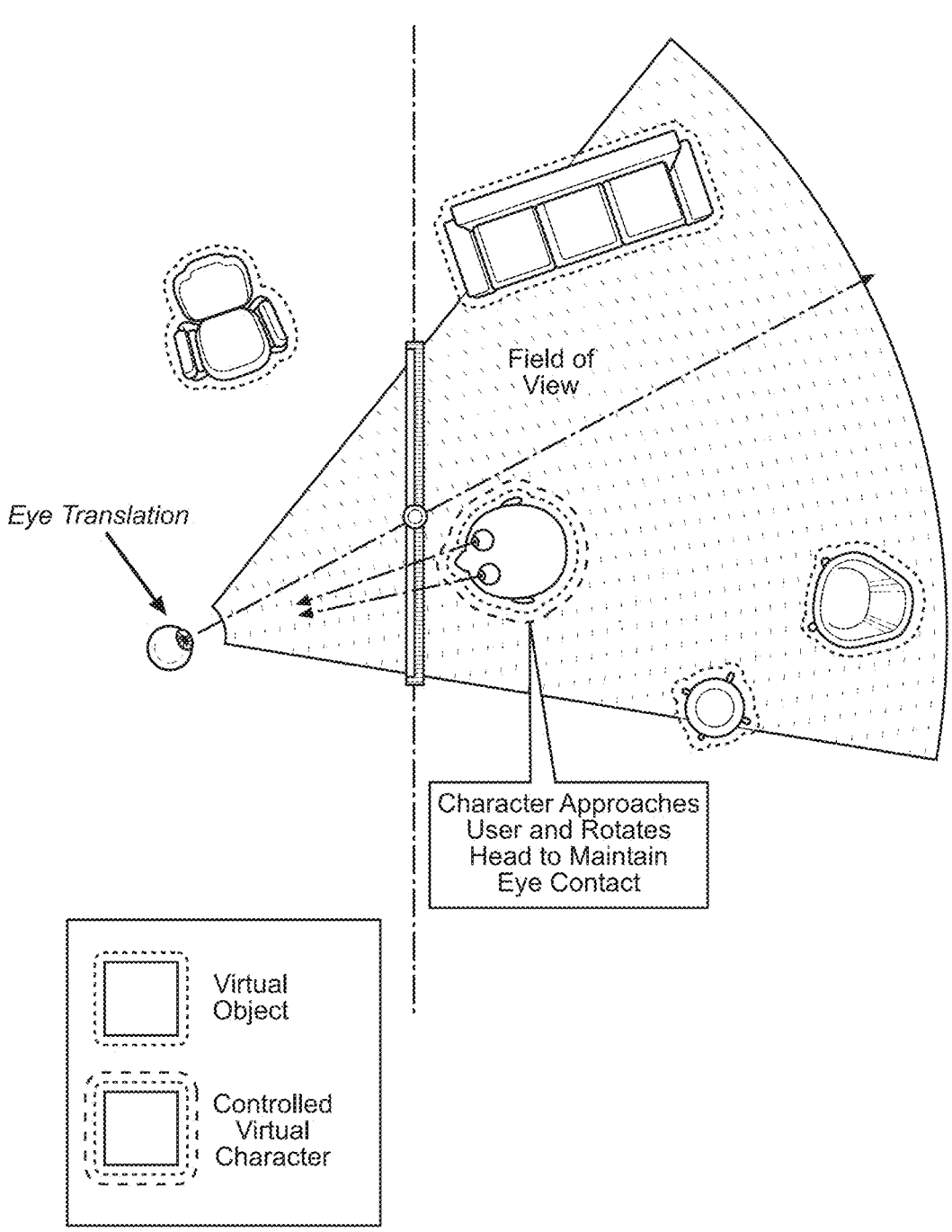

FIGS. 6, 9 and 12 show examples of a virtual scene like that shown in FIG. 1 and so, reference may be made to the description of FIG. 1 for these figures, especially the description of the coordinate system mapped on the screen of the display device. FIG. 6 shows a home position for use in explaining the interactive scene viewing depicted in FIGS. 7 and 8, FIG. 9 shows a home position for use in explaining the interactive object viewing depicted in FIGS. 10 and 11, and FIG. 12 shows a home position for use in explaining the interactive virtual character animation 1200 depicted in FIGS. 13-15.

Figure 7:
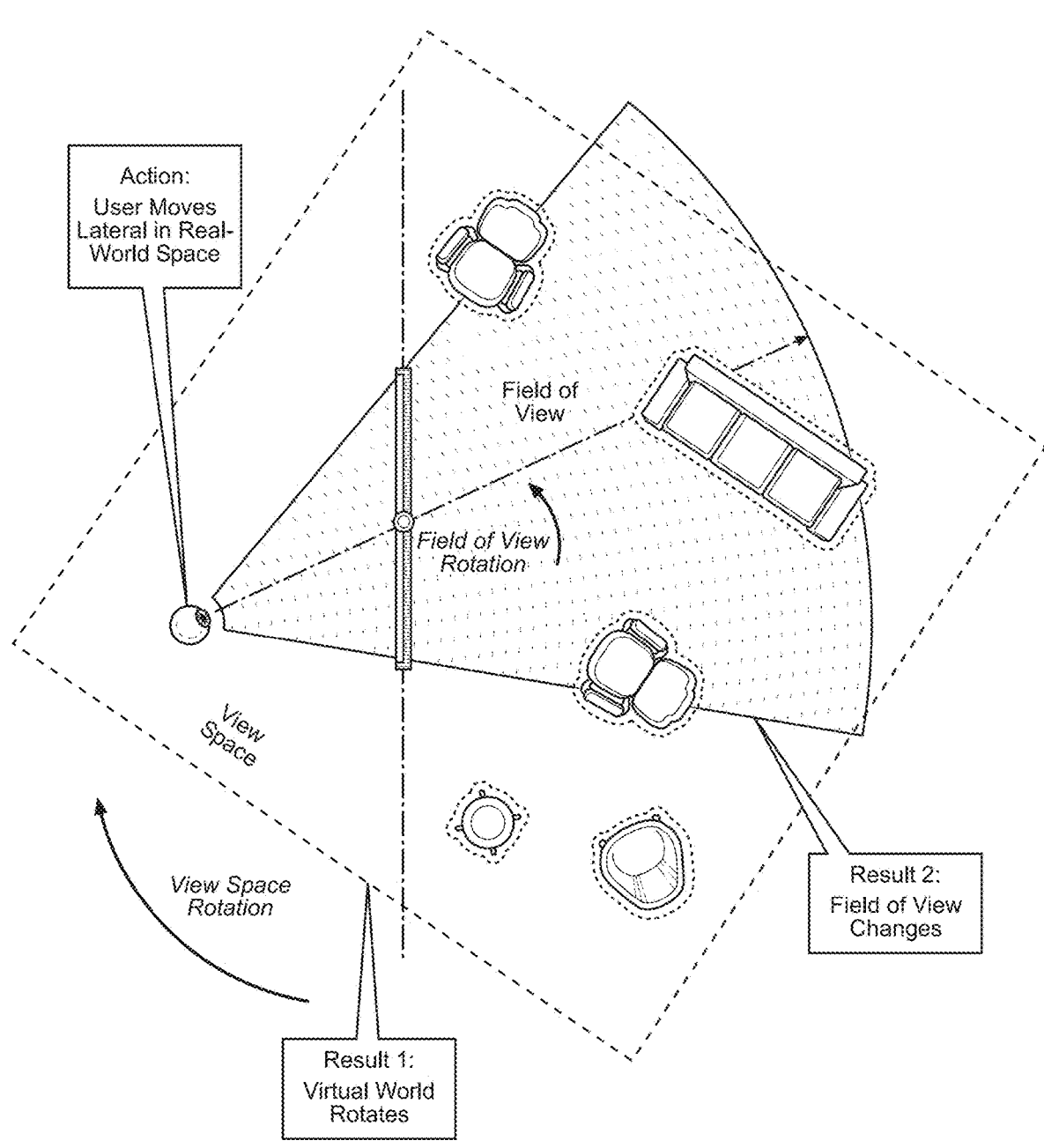

In the scene hyper-rotation mode shown in the example of FIGS. 6 and 7, an entire scene of virtual objects (virtual world) constituting the target content is rotated (in the X-Z plane 600), based on the anatomical tracking data as the user's eyes or other anatomical feature changes (is displaced in the X-axis direction relative to the center of the plane of the screen). In this mode, not only does the field of view of the virtual scene perceived by the user change, but the orientations of the virtual objects relative to the user change. This mode allows 360 degrees viewing of the scene, for example.

In the scene hyper-translation mode shown in the example of FIGS. 6 and 8, an entire scene of virtual objects (virtual world) constituting the target content is translated (in the direction of the Z-axis) based on the anatomical tracking data as the user's eyes or other anatomical feature changes (is displaced along the Z-axis). In this mode, not only does the field of view of the virtual scene perceived by the user change, but the distances between the virtual objects and the user change. This mode allows for close-ups of the virtual scene, for example.

Figure 10:
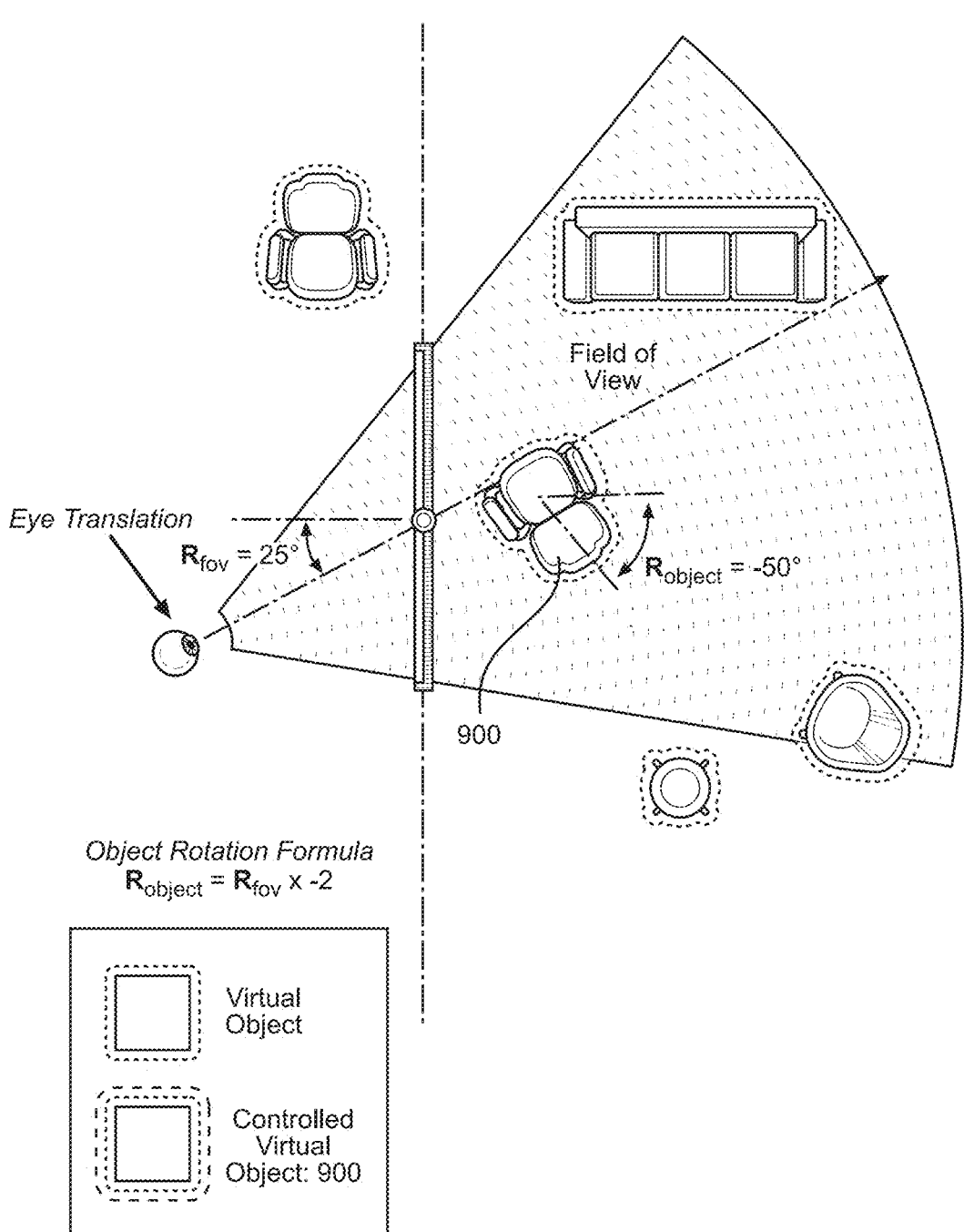

In object hyper-rotation (or sticky hyper-rotation) mode shown in the example of FIGS. 9 and 10, a virtual object (controlled virtual object 900) constituting the target content is rotated within the virtual scene, i.e., relative to the other virtual objects or rest of the virtual scene, based on the anatomical tracking data as the user's eyes or other anatomical feature changes (is displaced in the X-axis direction relative to the center of the screen). This mode allows for 360 degrees viewing of an object, i.e., seeing completely around a virtual object, for example.

In object hyper-translation (or sticky hyper-translation) mode shown in the example of FIGS. 9 and 11, a virtual object (controlled virtual object 900) constituting the target content is displaced (add or multiply) within the virtual scene, i.e., relative to the other virtual objects or rest of the virtual scene, based on the anatomical tracking data as the user's eyes or other anatomical feature changes (is displaced along the Z-axis). This mode allows for close-ups of a virtual object, for example.

In sticky hyper-rotation mode, the values of data giving rise to hyper-rotation are combined with a state variable which determines "current rotation". As the user's position relative to the center of the screen changes, the value for "current rotation" increases or decreases as a function of time and angle. Current rotation is then applied to target content.

Similarly, in sticky hyper-translation mode, hyper-translation is combined with a state variable, which determines "current translation". As the user's position relative to center of the screen changes, the value for "current translation" changes as a function of the user's position relative to a given point. Current translation is then applied to the target content.

In one example of object animation mode (FIGS. 12 and 13), a virtual character's head is rotated to maintain eye contact with the user based on the anatomical tracking data as the user's EP changes relative to the center of the screen. In another example of object animation mode (FIGS. 12 and 14), the character's eyes are rotated to maintain eye contact with the user based on the anatomical tracking data as the user's EP changes relative to the center of the screen. In still another example of object animation mode (FIGS. 12 and 15), the character's head is both translated toward the user and rotated to maintain eye contact with the user based on the anatomical tracking data as the user's EP changes relative to the center of the screen.

The advanced viewing modes described above may be augmented such that the target content is dynamically displaced to exclude the user's position, whereby the user's view does not appear as if it were originating from inside an object.

System Hardware and Software (Non-Transitory CRM) Components

Systems and methods for providing interactive viewing of target content using anatomical tracking, as well as the non-transitory computer readable media embodied in such systems according to the present technology will now be described with reference to FIGS. 16-23.

Figure 16:
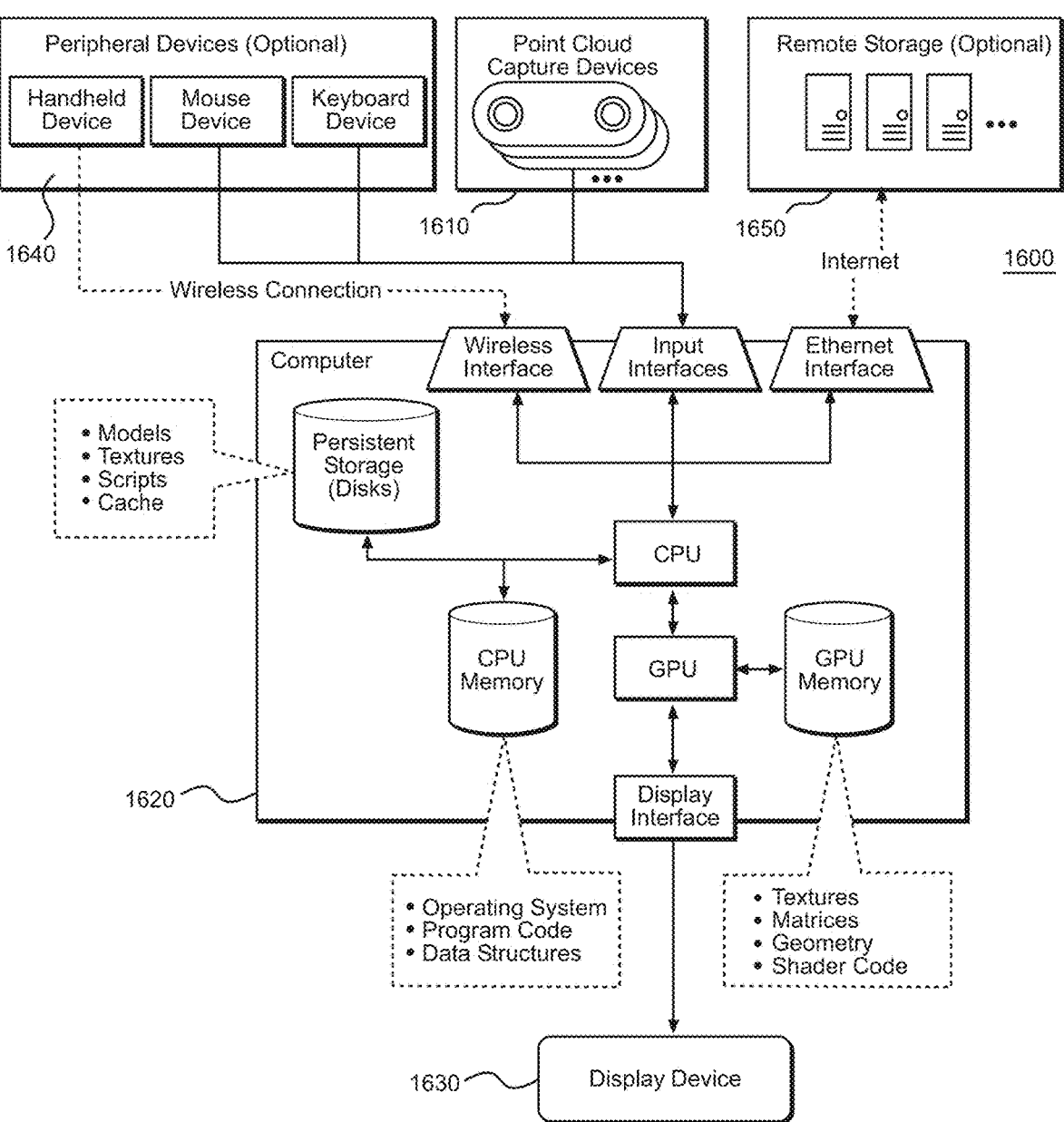

Referring to FIG. 16, an example of the overall system 1600 includes a point cloud capture device(s) 1610 that captures images of a subject (e.g., the user) and generates cloud point data providing a three-dimensional representation of the subject, a computer 1620 (machine) and a display device 1630 (e.g., a monitor) having a screen (100 in FIG. 1). The screen may be flat or curved. The system may also include peripheral devices 1640 by which a user can select a desired mode for their interactive viewing experience, and remote storage 1650 such as one or more servers connected to the computer 1620 over the internet or other network. The computer 1620 is in operative communication with the point cloud capture device(s) 1610 (through a wired connection, for example) so as to receive point cloud data from the point cloud capture device(s) 1610 and is operatively connected to the display device 1630 (through a wired connection, for example) so as to display the three-dimensional (3D) model of target content on the screen of the display device 1630.

Of note, the computer may include a GPU having an associated memory in which data of 3D model(s) used to form the virtual world on the screen of the display device is stored. As is generally known in the art of creating 3D models, per se, the data includes that of textures, matrices and geometry. Geometry refers to the 3D positional information of surfaces and connection points of the surfaces of an object. These are clumped in meshes. The matrices are those that are turned into a tree structure of the object model. Textures are just that, i.e., information representative of the texture of a surface of the object. Examples of textures include metallic, level of coarseness, and degree of transparency. The shader code is the software code written for the GPU, which runs the rendering pipeline of the GPU.

Figure 17:
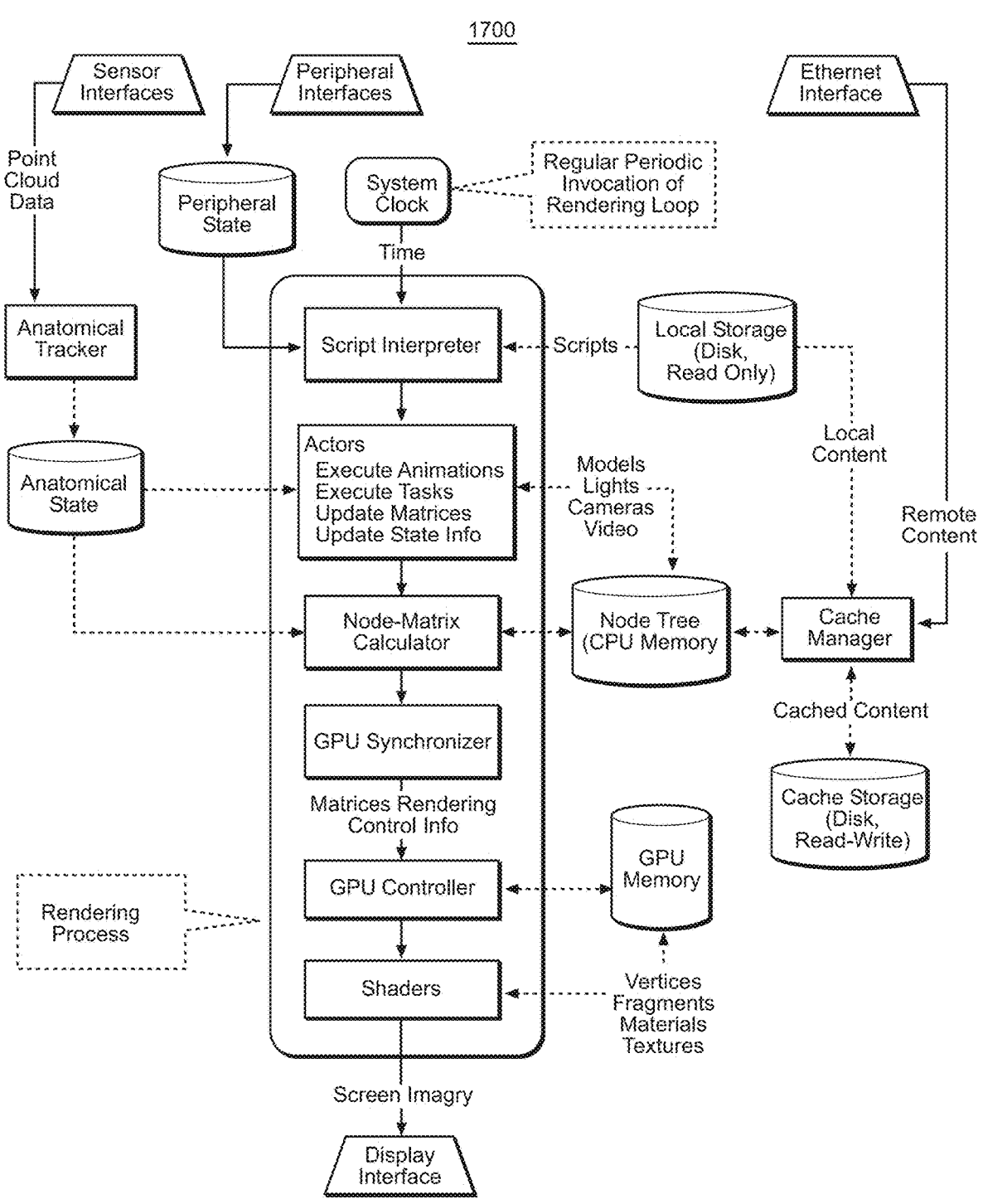

FIG. 17 illustrates an example of the computer ware 1700 of the system of FIG. 16, including software, and thus implements a method for interactive viewing according to the present technology. The software is embodied as various non-transitory computer readable media (CRM), namely, a CPU memory, GPU memory, SSD or HDD, etc. Of note with respect to this figure, the system clock establishes the cycles by which the images rendered on the screen of the display device are updated. This process runs according to the script. More specifically, the script provides the instructions for the manner in which the target content rendered on the screen of the display device changes dynamically. The "Actors" refer to specific features that are enabled by the script. Thus, as will be readily understood by those of ordinary skill in the art, this portion of the software as provided in non-transitory CRM constitutes an animator that runs every cycle set by the clock to perform certain tasks, examples of which are shown in the figure, whereby target content (a virtual world) is rendered on a screen of a display device to a user and is translated or rotated (including translation or rotation of features of a virtual character by which the character is animated) in response to the state of an anatomical feature(s) of the user.

These tasks are executed upon user request. For example, the user might request to exit the scene displayed on the screen and proceed to a new scene. The updating of matrices effects changes in rotation, translation and/or scale of the target content and therefore establishes the viewing mode for the user. State info refers to information about an aspect of the scene and may result in the rendering of corresponding text on the screen. The text might be characters that identify or provide information about a product in the scene.

The GPU synchronizer synchronizes the state info on the CPU with state info on the GPU by means of the GPU controller. The GPU renders the scene on the screen of the display device using data representing the model(s) of target content created from media input to the system and stored in the GPU memory.

Figure 18:
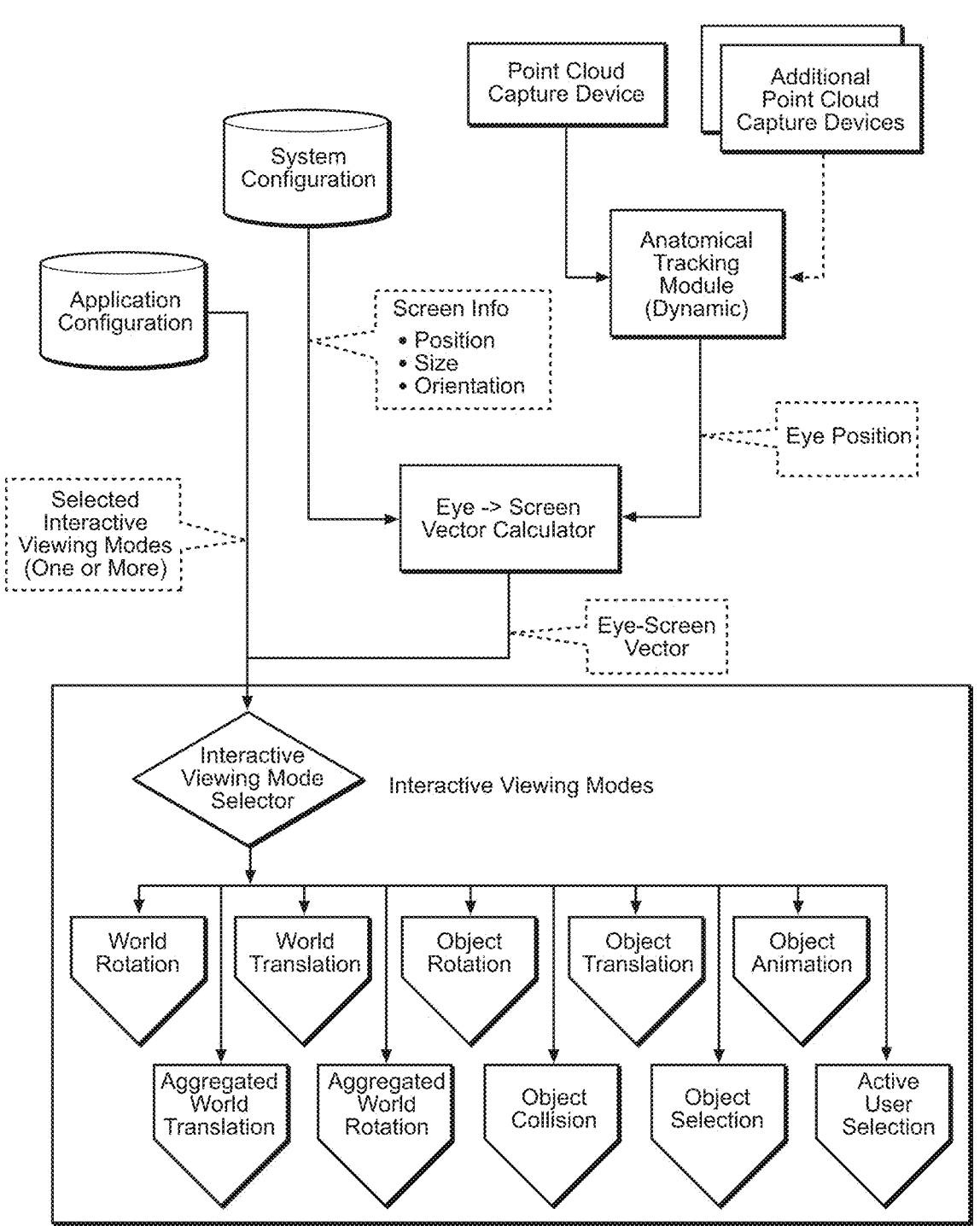
Figure 19:
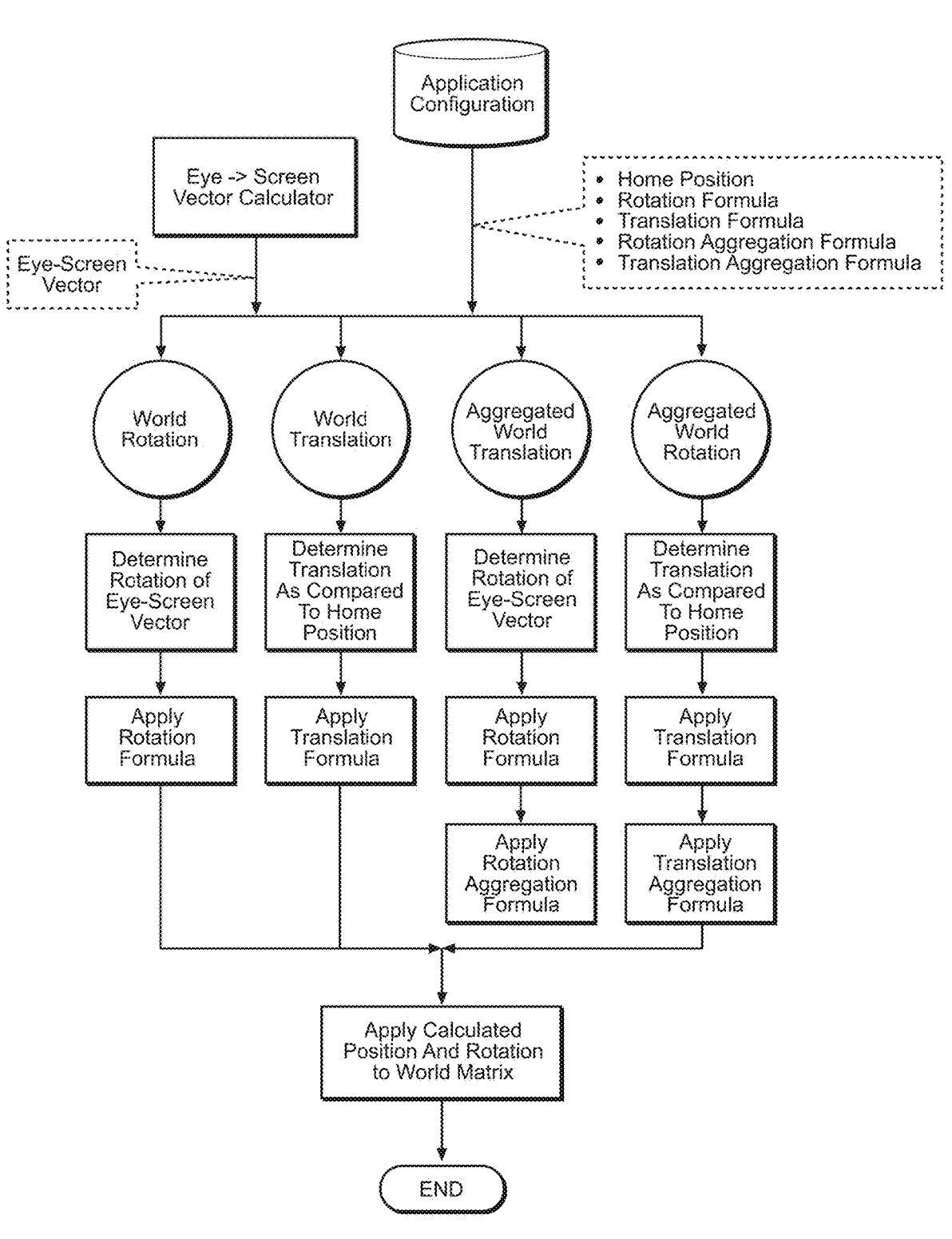
Figure 20:
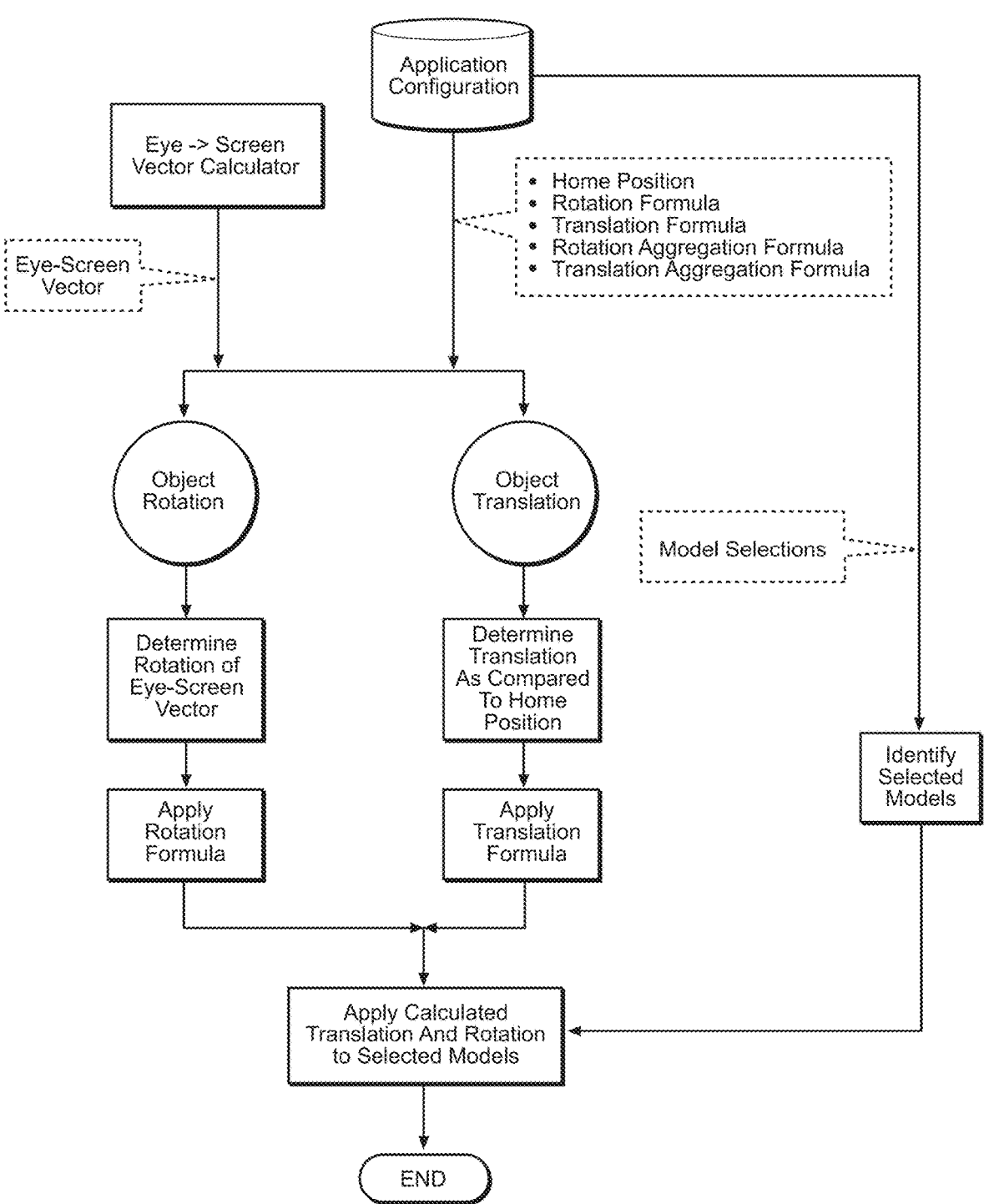
Figure 21:
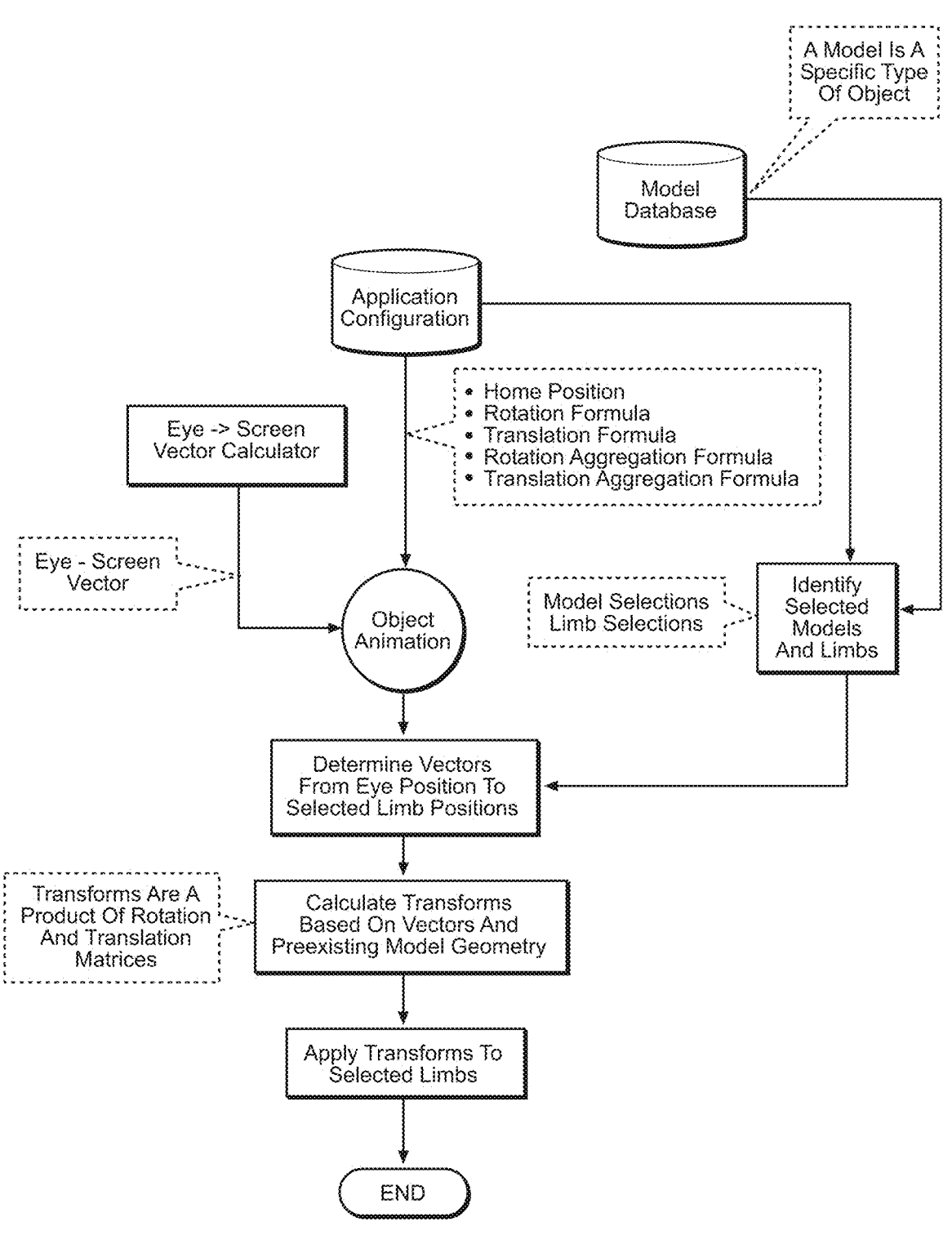
Figure 22:
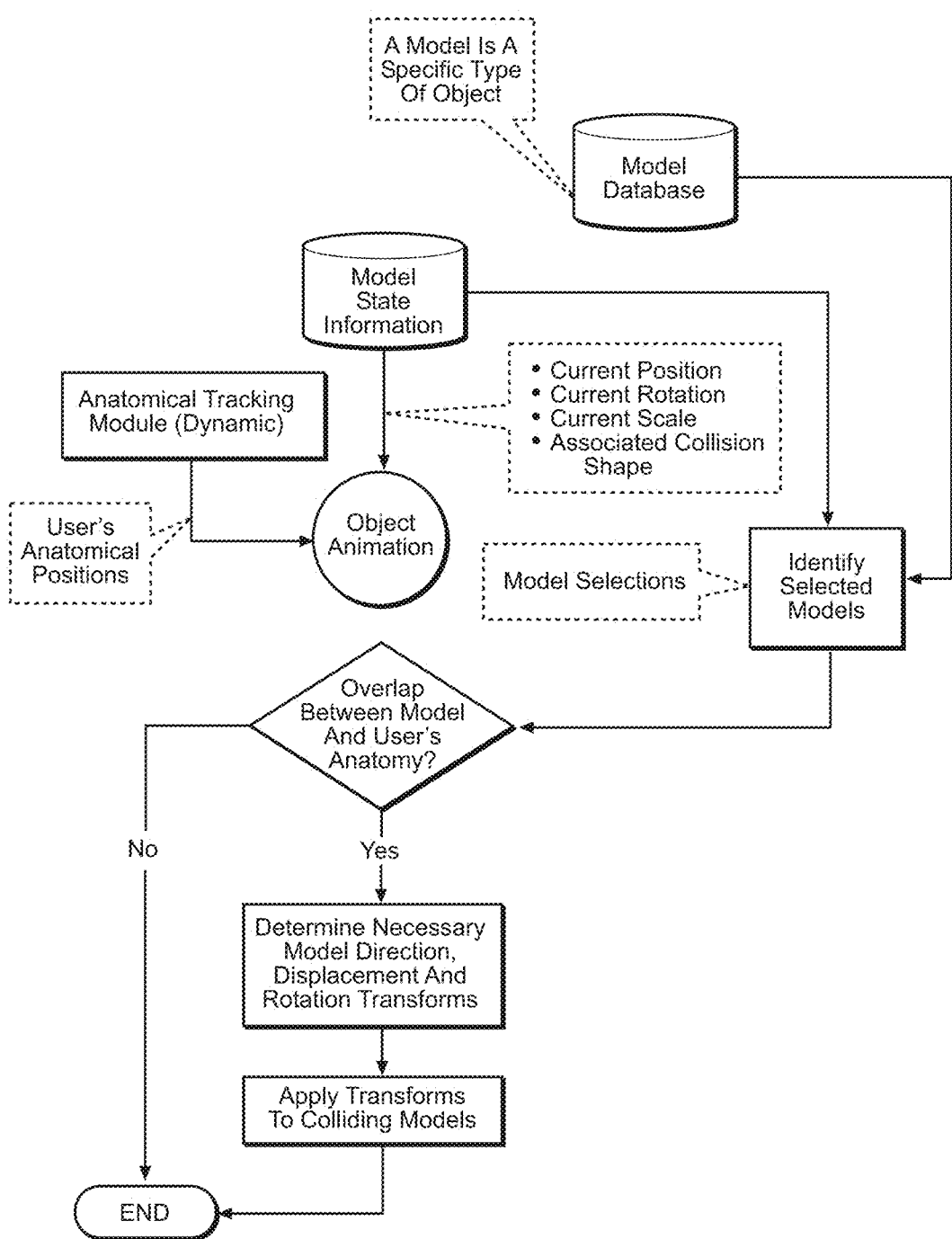
Figure 23:
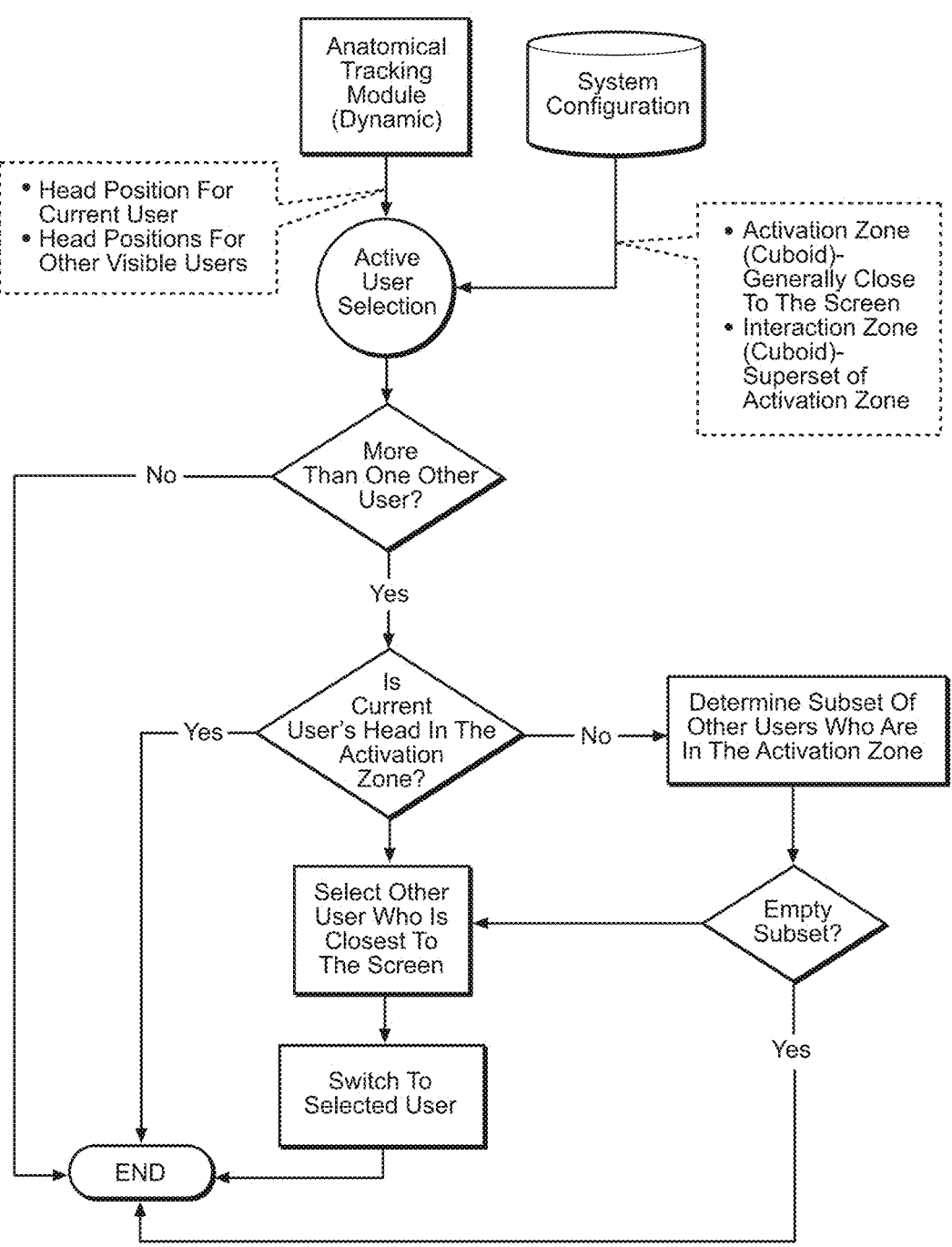
Figure 25:
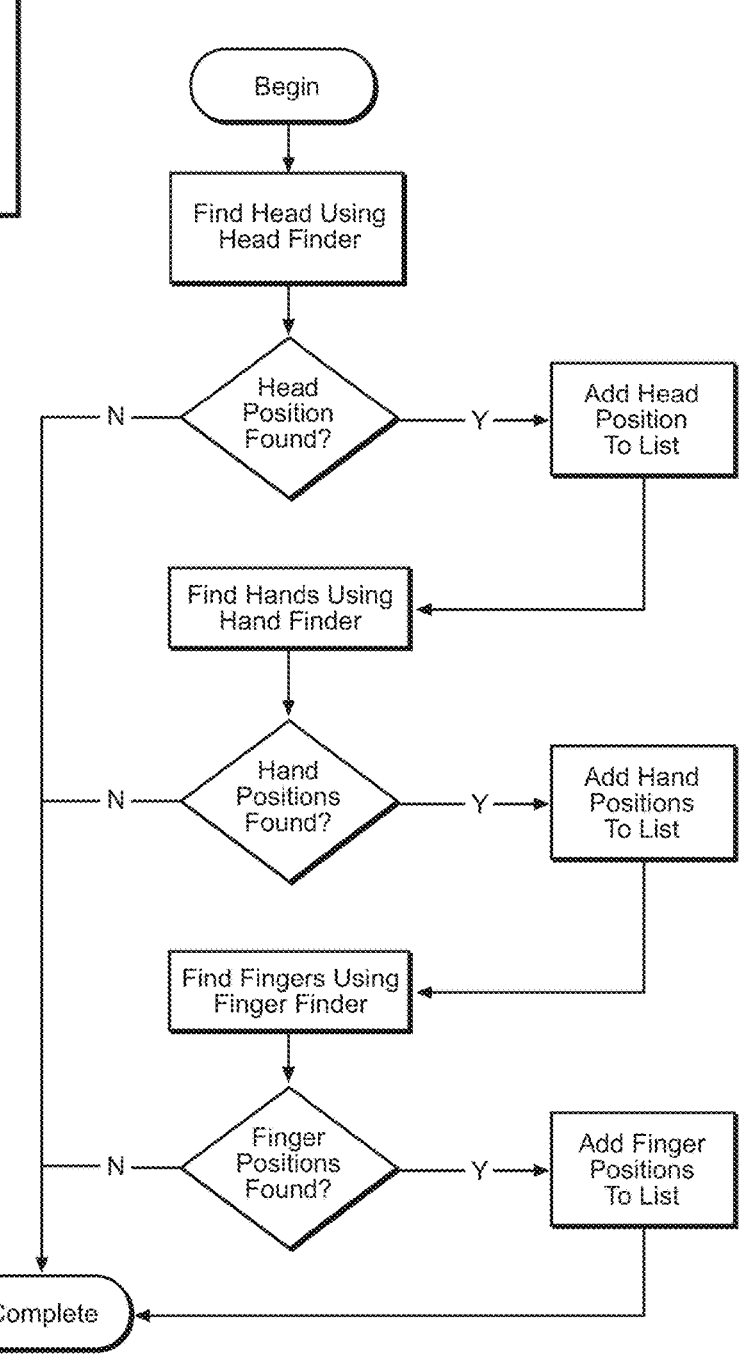
Figure 28:
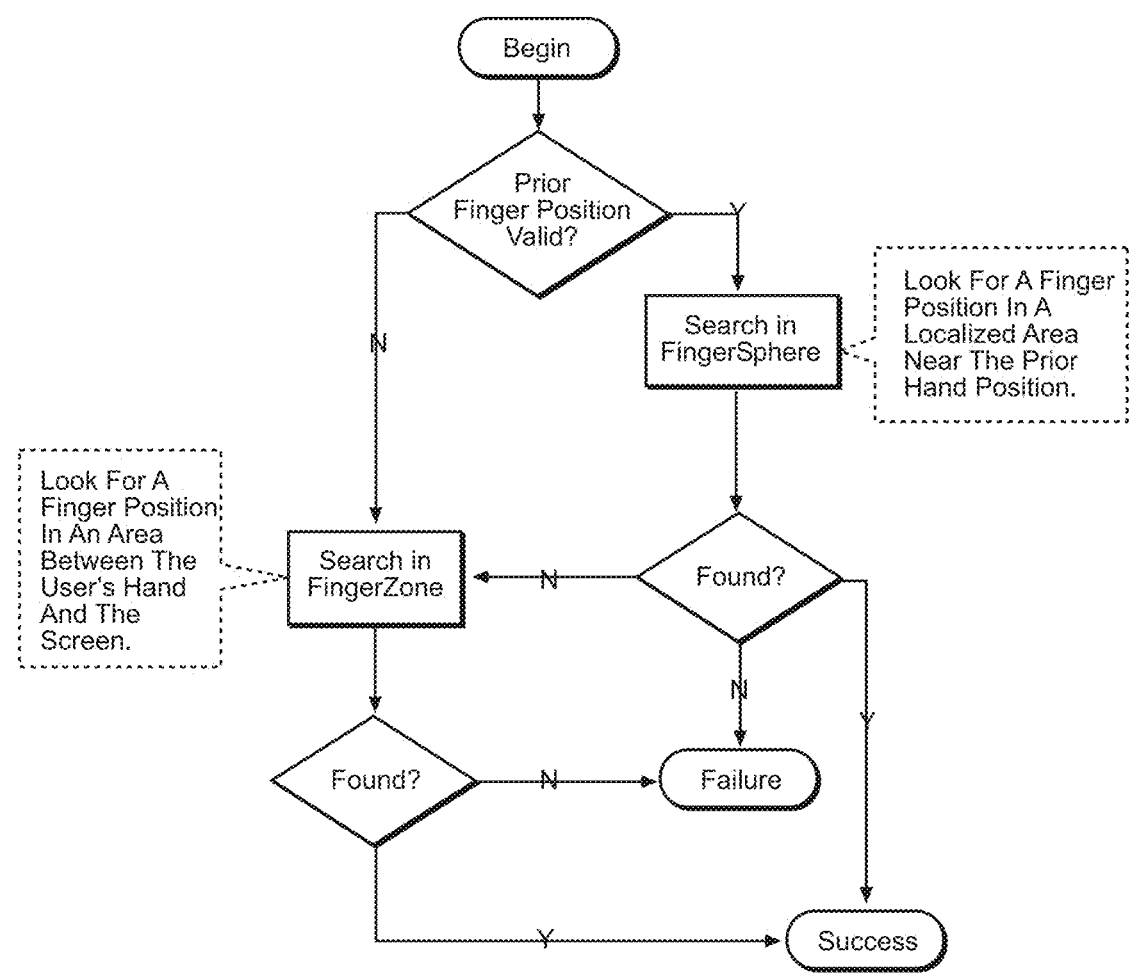
Figure 30:
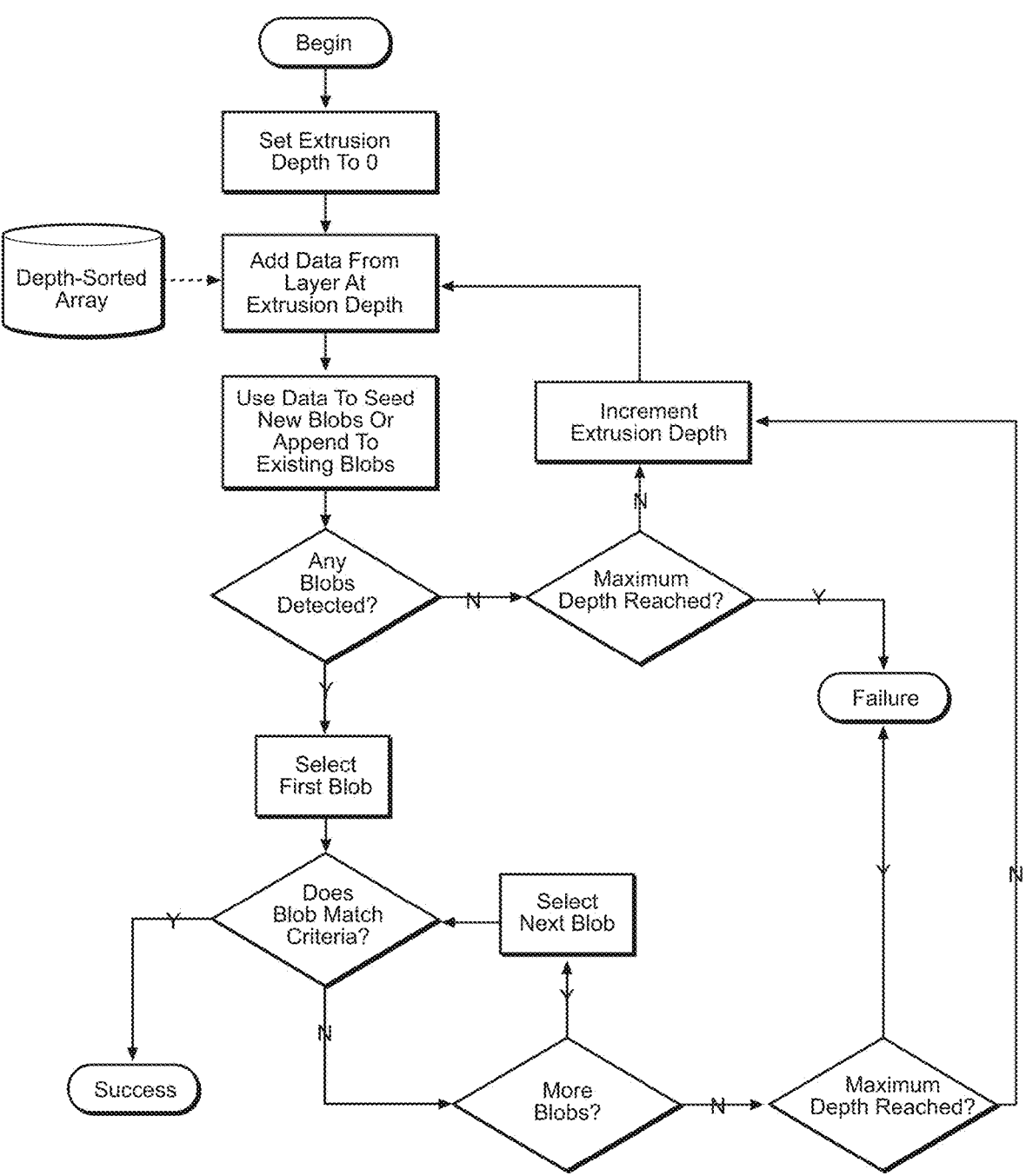

FIGS. 18-23 show respective examples of routines and subroutines in the overall method executed by the ware 1700 illustrated in FIG. 17. FIG. 18 shows a routine by which an interactive viewing mode (corresponding to the modes shown in and described with reference to FIGS. 6-15) is selected. FIG. 19 shows various subroutines associated with effecting the viewing modes of world rotation, world translation, aggregated world rotation and aggregated world translation. FIG. 20 shows subroutines for the viewing modes of object rotation and object translation. FIG. 21 shows a subroutine for the viewing mode of object animation. FIG. 22 shows a subroutine for the mode which prevents a collision between a virtual object and the perceived position of a user, i.e., which prevents the translation or rotation of the virtual world from causing the user to perceive him or herself as being inside an object. FIG. 23 shows a subroutine for selecting the user, i.e., identifying the active user, whose anatomical feature(s) is to be tracked and used to dynamically change the target content.

FIGS. 24-30 illustrate and provide a corresponding written description of examples of a process or routine of anatomical tracking using at least one point cloud capture device according to the present technology, including the algorithm by which the system of FIG. 16 produces anatomical tracking data of a user. These figures correspond to FIGS. 15-21 and the written descriptions thereof in the aforementioned U.S. Pat. No. 12,051,149.

Figure 35:
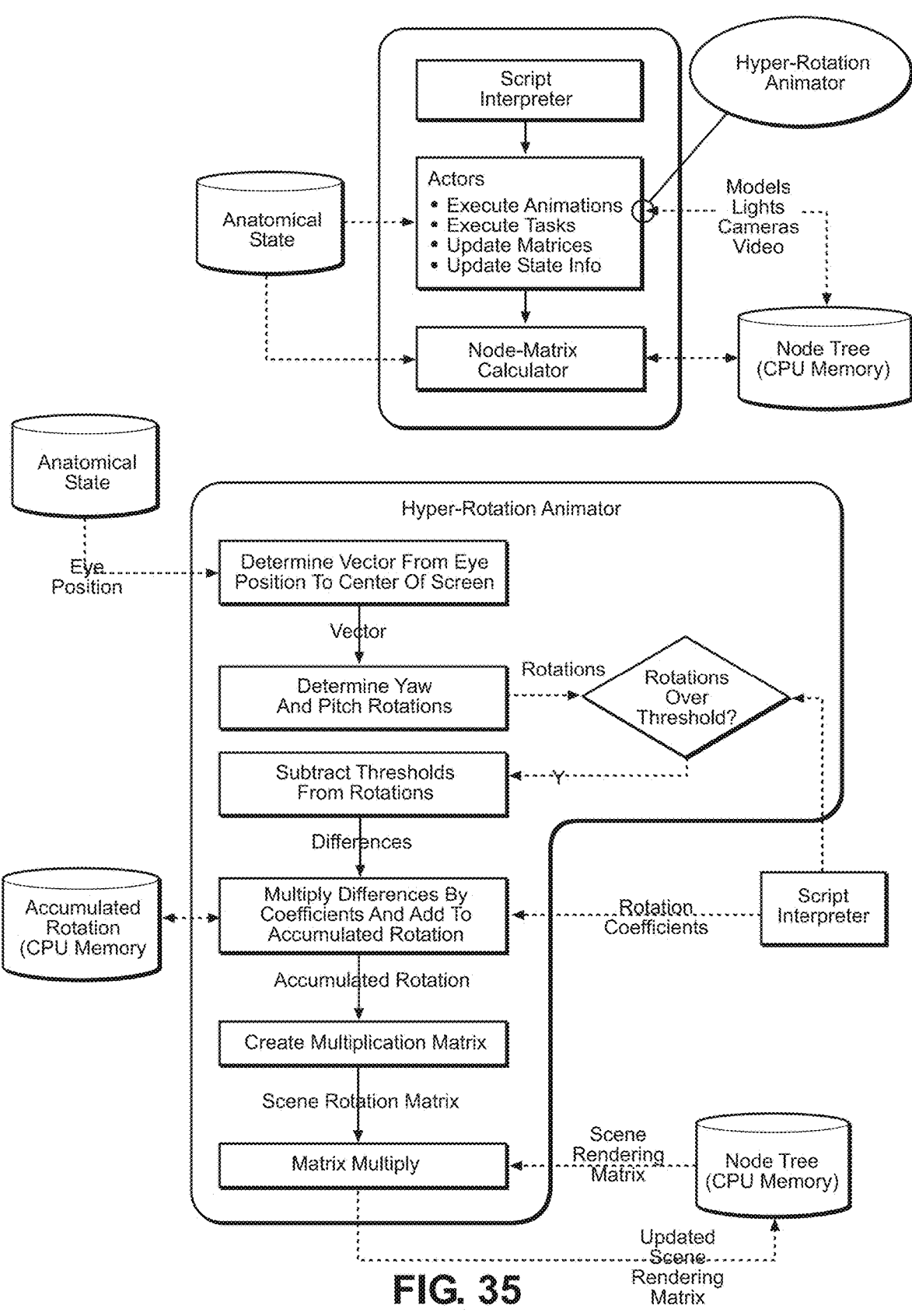
Figure 36:
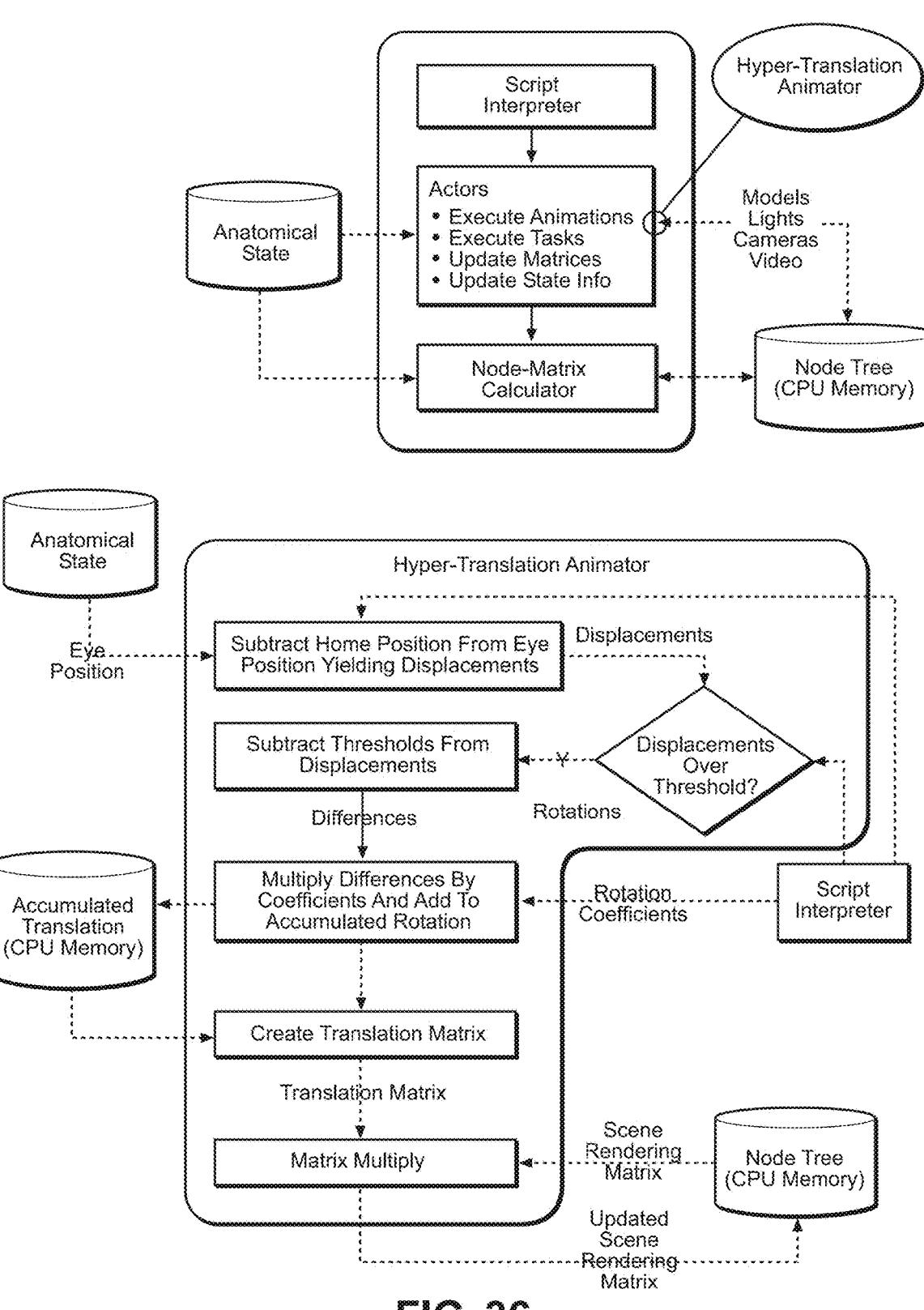

FIGS. 31-36 show examples of animators by which the target content (virtual world) is rendered, and the renderings are altered in respective ones of the interactive viewing modes according to the present technology. Thus, these figures illustrate the parameters and construct of algorithms embodying the formulae referred to in FIGS. 19-21. FIG. 31, by way of example, shows and describes an algorithm executed to rotate a virtual object. FIG. 32, by way of example, shows and describes an algorithm executed to translate a virtual object. FIG. 33, by way of example, shows and describes an algorithm executed to rotate a virtual scene. FIG. 34, by way of example, shows and describes an algorithm executed to translate a virtual scene. FIG. 35, by way of example, shows and describes an algorithm executed to rotate a virtual aggregated scene, and FIG. 36, by way of example, shows and describes an algorithm executed to translate a virtual aggregated scene. Accordingly, in examples of the present technology, the computer (machine) 1620 of FIG. 16 may comprise respective ones of the animators and may be configured to selectively execute any of the interactive viewing modes. The interactive viewing mode may be executed at any one time and may be user-selected via one of the peripheral devices 1640 by selecting an appropriate icon or entry on a drop-down menu, etc., displayed on the screen of the display device 1630.

As is clear from the description above, the present technology offers an enhancement of the speed at which a three-dimensional rendering of a virtual world can be rotated or translated based on the tracking of at least one anatomical feature of a user viewing the virtual world. Thus, the present technology obviates all the drawbacks and disadvantages associated with the use of VR headsets and the like and offers a truly enhanced immersive virtual reality experience. Furthermore, although the present technology has been described above in detail with respect to various embodiments and examples thereof, the technology may be embodied in many different forms to implement the present invention. Thus, the present invention should not be construed as being limited to the embodiments and their examples described above. Rather, these embodiments and examples were described so that this disclosure is thorough, complete, and fully conveys the present invention to those skilled in the art. Thus, the true spirit and scope of the present invention is not limited by the description above but by the following claims.

What is claimed is:

1. A method of creating an immersive three-dimensional viewing experience, the method comprising:
    capturing images of at least one anatomical feature of a user while the user is situated in a zone in front of a screen of a display, and producing image data comprising a digital representation of at least part of the user from the captured images;
    generating anatomical tracking data including by tracking one or more relative positions of the at least one anatomical feature of the user using the image data;
    rendering target content comprising a virtual scene, a virtual object or a virtual character on the screen of a display device in such a way that the target content is displayed in three dimensions to the user; and
    executing an interactive viewing mode in which a movement of the user effects a manipulation of the target content, the interactive viewing mode being selected from the group consisting of:
    rotating in its entirety the virtual scene, the virtual object, or the virtual character constituting the target content, based on the anatomical tracking data, as the one or more relative positions of the at least one anatomical feature of the user changes;
    translating in its entirety the virtual scene, the virtual object, or the virtual character constituting the target content, based on the anatomical tracking data, as the one or more relative positions of the at least one anatomical feature of the user changes; and
    animating the virtual scene, the virtual object, or the virtual character constituting the target content, based on the anatomical tracking data, as the one or more relative positions of the at least one anatomical feature of the user changes.

2. The method as claimed in claim 1, wherein the capturing of image data comprises acquiring point cloud data of the at least one anatomical feature of the user.

3. The method as claimed in claim 2, wherein the generating of the anatomical tracking data includes detecting from the point cloud data changes in position of the at least one anatomical feature, and inferring changes in the position of the at least one anatomical feature of the user relative to the screen of the display device from said changes in the position of the at least one anatomical feature.

4. The method as claimed in claim 3, wherein the generating of the anatomical tracking data includes detecting from the point cloud data changes in the position of the user's head and inferring changes in the position of the user's eyes relative to the screen from said changes in position of the user's head.

5. The method as claimed in claim 3, wherein the rendering of the target content comprises calculating vectors for pixels of the screen, each of the vectors originating from the position of the user's eyes and pointing toward a respective pixel based on a coordinate system of the screen.

6. The method as claimed in claim 1, wherein the rendering of the target content comprises calculating vectors for pixels of the screen, each of the vectors originating from a position of the user's eyes and pointing toward a respective pixel based on a coordinate system of the screen.

7. The method as claimed in claim 1, further comprising detecting for a blob in an image of the user represented by the image data as the user enters a zone in front of the screen of the display device, and wherein the anatomical tracking data is generated only once the blob in the image data has been detected.

8. The method as claimed in claim 1, wherein the execution of the interactive viewing mode comprises dynamically determining yaw and pitch of a vector from a position of eyes of the user to a center of the screen of the display and rotating in its entirety the virtual scene, the virtual object, or the virtual character constituting the target content based on changes in the yaw and the pitch of the vector.

9. The method as claimed in claim 1, wherein the execution of the interactive viewing mode comprises determining translation of a position of eyes of the user in directions toward or away from the screen of the display, and translating in its entirety the virtual scene, the virtual object, or the virtual character constituting the target content toward or away from the user based on said translation of the position of the eyes of the user.

10. A method of creating an immersive three-dimensional viewing experience, the method comprising:

acquiring image data of a user while the user is situated in front of a screen of a display device, the acquiring of the image data comprising producing point cloud data of at least one anatomical feature of the user;

generating anatomical tracking data using the image data by inferring from the point cloud data a position of the at least one anatomical feature of the user relative to the screen of the display device, the anatomical tracking data changing dynamically as the user moves the at least one anatomical feature;

rendering a three-dimensional (3D) model of target content and displaying the model to the user via the screen of the display device; and executing an interactive viewing mode in which the 3D model of the target content is translated or rotated or is animated based on changes in the anatomical tracking data, whereby movement of the at least one anatomical feature by the user manipulates the target content.

11. The method as claimed in claim 10, further comprising detecting for a blob in an image of the user represented by the image data as the user enters a zone in front of the screen of the display device, and wherein the anatomical tracking data is generated only once the blob in the image data has been detected.

12. The method as claimed in claim 10, wherein the 3D model is rendered with respect to a Cartesian coordinate system having an origin at a central position of the screen of the display device, X and Y axes are mapped along the screen of the display device and a Z axis is extending through the screen at the origin, the rendering of the 3D model of the target content comprises rendering a virtual scene of objects, and the executing of the interactive viewing mode comprises rotating the virtual scene in its entirety in the X-Z plane of the coordinate system and changing a field of view of the virtual scene by the user, based on changes in the anatomical tracking data indicating that the at least one anatomical feature of the user is moving in the X-Z plane.

13. The method as claimed in claim 10, wherein the 3D model is rendered with respect to a Cartesian coordinate system having an origin at a central position of the screen of the display device, X and Y axes are mapped along the screen of the display device and a Z axis is extending through the screen at the origin, the rendering of the 3D model of the target content comprises rendering a virtual scene of objects, and the executing of the interactive viewing mode comprises translating the virtual scene in its entirety along the Z axis of the coordinate system and changing a field of view of the virtual scene by the user, based on changes in the anatomical tracking data indicating that the at least one anatomical feature of the user is moving in a direction along or parallel to the Z axis.

14. The method as claimed in claim 10, wherein the 3D model is rendered with respect to a Cartesian coordinate system having an origin at a central position of the screen of the display device, X and Y axes are mapped along the screen of the display device and a Z axis is extending through the screen at the origin, the rendering of the 3D model of the target content comprises rendering a virtual scene of objects, and the executing of the interactive viewing mode comprises translating one of the virtual objects within the virtual scene in a direction along or parallel to the Z axis of the coordinate system while maintaining a field of view of the virtual scene by the user, based on changes in the anatomical tracking data indicating that the at least one anatomical feature of the user is moving in a direction along or parallel to the Z axis.

15. The method as claimed in claim 10, wherein the 3D model is rendered with respect to a Cartesian coordinate system having an origin at a central position of the screen of the display device, X and Y axes are mapped with the screen of the display device and a Z axis is extending through the screen at the origin, the rendering of the 3D model of the target content comprises rendering a virtual scene of objects, and the executing of the interactive viewing mode comprises rotating one of the virtual objects within the virtual scene about the Y axis of the coordinate system while maintaining a field of view of the virtual scene by the user, based on changes in the anatomical tracking data indicating that the at least one anatomical feature of the user is moving in a direction in the X-Z plane of the coordinate system.

16. The method as claimed in claim 10, wherein the 3D model is rendered with respect to a Cartesian coordinate system having an origin at a central position of the screen of the display device, X and Y axes are mapped along the screen of the display device and a Z axis is extending through the screen at the origin, the rendering of the 3D model of the target content comprises rendering a virtual scene including a virtual character, and the executing of the interactive viewing mode comprises animating the virtual character while maintaining a field of view of the virtual scene by the user, based on changes in the anatomical tracking data indicating that the at least one anatomical feature of the user is moving, wherein the animating of features of the virtual character comprises rotating or translating select features of the virtual character within the virtual scene.

17. The method as claimed in claim 10, the generating of the anatomical tracking data further comprising detecting from the point cloud data changes in the position of the user's head and inferring changes in the position of the user's eyes relative to the screen from said changes in the position of the user's head.

18. A machine having a processing unit, and non-transitory computer-readable media (CRM) storing operating instructions and digital target content representing a virtual scene, a virtual object, or a virtual character, the processing unit being configured to execute the operating instructions to:

render a three-dimensional (3D) model of the digital target content and display the 3D model to a user via a screen of a display device;

generate anatomical tracking data using point cloud capture data, the anatomical tracking data representative of a position of an anatomical feature of the user such that the anatomical tracking data changes dynamically as the user moves the anatomical feature; and execute an interactive viewing mode in which a movement of the anatomical feature of the user manipulates the digital target content, the interactive viewing mode being selected from a group consisting of:

rotating in its entirety the virtual scene, the virtual object, or the virtual character constituting the digital target content, based on the anatomical tracking data, as the position of the anatomical feature of the user changes, translating in its entirety the virtual scene, the virtual object, or the virtual character constituting the digital target content, based on the anatomical tracking data, as the position of the anatomical feature of the user changes, and animating the virtual scene, the virtual object, or the virtual character constituting the digital target content, based on the anatomical tracking data, as the position of the anatomical feature of the user changes.

19. The machine as claimed in claim 18, wherein the processing unit is configured to execute the operating instructions to:

selectively execute interactive viewing modes in which a movement of the anatomical feature of the user manipulates the digital target content as based on the anatomical tracking data, the interactive viewing modes selected from the group including:

a virtual scene rotation mode of rotating in its entirety the virtual scene including a plurality of distinct objects constituting the digital target content, a virtual scene translation mode of translating in its entirety the virtual scene including a plurality of distinct objects constituting the digital target content, a virtual object rotation mode of rotating in its entirety the virtual object constituting the digital target content, a virtual object translation mode of rotating in its entirety the virtual object constituting the digital target content, based on the anatomical tracking data, and a virtual character animation mode of animating features of the virtual character to move along with the movement of the anatomical feature of the user.

20. An interactive viewing system for creating an immersive three-dimensional viewing experience, the system comprising the machine as claimed in claim 18, and further comprising:

at least one point cloud capture device that captures images of a subject and generates point cloud data of a three-dimensional representation of the subject; and a display device having a screen; and wherein the machine is in operative communication with the at least one point cloud capture device so as to receive image data from the at least one point cloud capture device and generate the anatomical tracking data, and is operatively connected to the display device so as to display the three-dimensional (3D) model the digital target content on the screen of the display device.

* * * * *